US 11,795,805 B2

(12) United States Patent
Zheng et al.

(10) Patent No.: US 11,795,805 B2
(45) Date of Patent: Oct. 24, 2023

(54) WELL CONSTRUCTION COMMUNICATION AND CONTROL

(71) Applicant: Schlumberger Technology Corporation, Sugar Land, TX (US)

(72) Inventors: Shunfeng Zheng, Katy, TX (US); Juan Jose Rojas, Sandsli (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 69 days.

(21) Appl. No.: 17/450,410

(22) Filed: Oct. 8, 2021

(65) Prior Publication Data
US 2022/0025754 A1    Jan. 27, 2022

Related U.S. Application Data

(63) Continuation of application No. 15/621,107, filed on Jun. 13, 2017, now Pat. No. 11,143,010.

(51) Int. Cl.
*E21B 44/00* (2006.01)
*G06Q 10/06* (2023.01)
*H04L 67/12* (2022.01)

(52) U.S. Cl.
CPC ............ *E21B 44/00* (2013.01); *G06Q 10/06* (2013.01); *H04L 67/12* (2013.01)

(58) Field of Classification Search
CPC .......... E21B 44/00; G06Q 10/06; H04L 67/12
See application file for complete search history.

(56) References Cited

U.S. PATENT DOCUMENTS

| | | | |
|---|---|---|---|
| 4,480,480 | A | 11/1984 | Scott et al. |
| 4,583,170 | A | 4/1986 | Carlin et al. |
| 5,493,288 | A | 2/1996 | Henneuse |
| 5,597,042 | A | 1/1997 | Tubel et al. |
| 5,670,878 | A | 9/1997 | Katahara et al. |
| 5,775,803 | A | 7/1998 | Montgomery et al. |

(Continued)

FOREIGN PATENT DOCUMENTS

| | | |
|---|---|---|
| WO | 2003053025 A1 | 6/2003 |
| WO | 2015190934 A1 | 12/2015 |

(Continued)

*Primary Examiner* — Quan Zhen Wang
*Assistant Examiner* — Mancil Littlejohn, Jr.
(74) *Attorney, Agent, or Firm* — Aashish Y. Chawla

(57) ABSTRACT

Apparatus and methods regarding a first processing system operable to receive a job plan developed by a second processing system, and implement the job plan, including generating commands for an equipment controller based on the job plan. The first processing system is operable to transmit, through a network, the commands to the controller for execution by the controller. The first processing system is operable to iteratively (i) monitor, through the network, current conditions of the well construction system during execution of commands by the controller; (ii) update the implementation of the job plan, including generating updated commands for the controller based on the job plan and the current well construction system conditions when the current well construction system conditions indicate a deviation from the implementation; and (iii) transmit, through the network, the updated commands to the controller for execution by the controller.

20 Claims, 6 Drawing Sheets

(56) References Cited

U.S. PATENT DOCUMENTS

| | | |
|---|---|---|
| 5,960,883 A | 10/1999 | Tubel et al. |
| 6,338,390 B1 | 1/2002 | Tibbitts |
| 6,382,331 B1 | 5/2002 | Pinckard |
| 6,484,816 B1 | 11/2002 | Koederitz |
| 6,519,568 B1 | 2/2003 | Harvey et al. |
| 6,677,861 B1 | 1/2004 | Henry et al. |
| 6,749,330 B2 | 6/2004 | Allen |
| 6,873,267 B1 | 3/2005 | Tubel et al. |
| 6,892,812 B2 | 5/2005 | Niedermayr et al. |
| 6,896,055 B2 | 5/2005 | Koithan |
| 6,931,621 B2 | 8/2005 | Green et al. |
| 6,938,258 B1 | 8/2005 | Weinberger et al. |
| 6,944,547 B2 | 9/2005 | Womer et al. |
| 6,985,750 B1 | 1/2006 | Vicknair et al. |
| 6,994,172 B2 | 2/2006 | Ray |
| 7,172,037 B2 | 2/2007 | Dashevskiy et al. |
| 7,200,643 B2 | 4/2007 | Latvakoski et al. |
| 7,207,396 B2 | 4/2007 | Hall et al. |
| 7,242,317 B2 | 7/2007 | Silvers |
| 7,264,050 B2 | 9/2007 | Koithan et al. |
| 7,357,196 B2 | 4/2008 | Goldman et al. |
| 7,570,175 B2 | 8/2009 | Johnson et al. |
| 7,574,325 B2 | 8/2009 | Dykstra |
| 7,668,117 B2 | 2/2010 | Johnson et al. |
| 7,672,262 B2 | 3/2010 | McCoy et al. |
| 7,748,450 B2 | 7/2010 | Mundell |
| 7,860,593 B2 | 12/2010 | Boone |
| 7,938,197 B2 | 5/2011 | Boone et al. |
| 8,121,971 B2 | 2/2012 | Edwards et al. |
| 8,149,133 B2 | 4/2012 | Milne |
| 8,154,419 B2 | 4/2012 | Daussin et al. |
| 8,204,692 B2 | 6/2012 | Arango et al. |
| 8,215,417 B2 | 7/2012 | Annaiyappa et al. |
| 8,260,736 B1 | 9/2012 | Lear et al. |
| 8,301,386 B1 | 10/2012 | Redmond et al. |
| 8,347,957 B2 | 1/2013 | Stephenson et al. |
| 8,358,220 B2 | 1/2013 | Savage |
| 8,386,059 B2 | 2/2013 | Boone |
| 8,590,635 B2 | 11/2013 | Koederitz |
| 8,615,217 B2 | 12/2013 | Ravishankar et al. |
| 8,616,274 B2 | 12/2013 | Belcher et al. |
| 8,667,589 B1 | 3/2014 | Saprygin et al. |
| 8,718,802 B2 | 5/2014 | Boone |
| 8,761,911 B1 | 6/2014 | Chapman et al. |
| 8,761,912 B1 | 6/2014 | Chapman, Jr. et al. |
| 8,838,695 B2 | 9/2014 | Foreman et al. |
| 8,914,267 B2 | 12/2014 | Brink et al. |
| 9,013,322 B2 | 4/2015 | Roberson et al. |
| 9,024,778 B2 | 5/2015 | Winkler et al. |
| 9,026,270 B2 | 5/2015 | Poettker et al. |
| 9,027,671 B2 | 5/2015 | Koederitz |
| 9,035,789 B2 | 5/2015 | Loi et al. |
| 9,175,557 B2 | 11/2015 | Iversen et al. |
| 9,194,228 B2 | 11/2015 | Hall |
| 9,219,760 B2 | 12/2015 | Flanders et al. |
| 9,223,594 B2 | 12/2015 | Brown et al. |
| 9,255,473 B2 | 2/2016 | Burress et al. |
| 9,268,773 B2 | 2/2016 | Arango et al. |
| 9,285,794 B2 | 3/2016 | Wang et al. |
| 9,322,247 B2 | 4/2016 | Rojas et al. |
| 9,359,882 B2 | 6/2016 | Snyder |
| 9,429,009 B2 | 8/2016 | Paulk et al. |
| 9,429,678 B2 | 8/2016 | Abitrabi et al. |
| 9,436,173 B2 | 9/2016 | Wang et al. |
| 9,441,428 B1 | 9/2016 | Barnes et al. |
| 9,466,197 B2 | 10/2016 | Hildick-Pytte |
| 9,506,336 B2 | 11/2016 | Orbell |
| 9,518,459 B1 | 12/2016 | Bermudez Martinez et al. |
| 9,546,545 B2 | 1/2017 | Cardellini et al. |
| 9,593,567 B2 | 3/2017 | Pink et al. |
| 9,598,947 B2 | 3/2017 | Wang et al. |
| 9,709,978 B2 | 7/2017 | Asenjo et al. |
| 10,705,499 B2 | 7/2020 | Rojas et al. |
| 11,143,010 B2 * | 10/2021 | Zheng .................. E21B 44/00 |
| 2002/0118387 A1 | 8/2002 | Patton |
| 2003/0182012 A1 | 9/2003 | Yamauchi et al. |
| 2004/0098422 A1 | 5/2004 | Levesque et al. |
| 2004/0204772 A1 | 10/2004 | Maturana et al. |
| 2005/0036507 A1 | 2/2005 | Hall et al. |
| 2005/0083209 A1 | 4/2005 | Miyamae et al. |
| 2005/0091265 A1 | 4/2005 | Rimer et al. |
| 2005/0092499 A1 | 5/2005 | Hall et al. |
| 2005/0209912 A1 * | 9/2005 | Veeningen ............ G06Q 10/10 705/7.12 |
| 2006/0173625 A1 | 8/2006 | Moran |
| 2006/0174045 A1 | 8/2006 | Maeda et al. |
| 2007/0067458 A1 | 3/2007 | Chand |
| 2007/0189166 A1 | 8/2007 | Johnson et al. |
| 2007/0211691 A1 | 9/2007 | Barber et al. |
| 2008/0140811 A1 | 6/2008 | Welch |
| 2008/0162357 A1 | 7/2008 | Gerardi et al. |
| 2008/0208475 A1 | 8/2008 | Karr et al. |
| 2009/0045973 A1 | 2/2009 | Rodney et al. |
| 2009/0055029 A1 | 2/2009 | Roberson et al. |
| 2009/0254325 A1 * | 10/2009 | Gokdemir ............ G01V 99/00 703/10 |
| 2010/0147510 A1 | 6/2010 | Kwok et al. |
| 2010/0147589 A1 | 6/2010 | Wingky |
| 2010/0155142 A1 | 6/2010 | Thambynayagam et al. |
| 2010/0185395 A1 | 7/2010 | Pirovolou et al. |
| 2011/0004355 A1 | 1/2011 | Wang et al. |
| 2011/0186303 A1 | 8/2011 | Scott et al. |
| 2011/0186353 A1 | 8/2011 | Turner et al. |
| 2011/0258262 A1 * | 10/2011 | Bezdicek ............. H04L 67/565 719/314 |
| 2012/0079278 A1 | 3/2012 | Patch et al. |
| 2012/0131309 A1 | 5/2012 | Johnson et al. |
| 2012/0139747 A1 | 6/2012 | Papouras et al. |
| 2012/0278864 A1 | 11/2012 | Dugeon et al. |
| 2013/0003107 A1 | 1/2013 | Berglin |
| 2013/0076525 A1 | 3/2013 | Vu et al. |
| 2013/0140031 A1 | 6/2013 | Cohen et al. |
| 2013/0198509 A1 | 8/2013 | Buruganahalli et al. |
| 2014/0101663 A1 | 4/2014 | Dickson |
| 2014/0143376 A1 | 5/2014 | Beaulac et al. |
| 2014/0151121 A1 | 6/2014 | Boone et al. |
| 2014/0192621 A1 | 7/2014 | Ram et al. |
| 2014/0237561 A1 | 8/2014 | Mraz |
| 2014/0309936 A1 | 10/2014 | Abbassian et al. |
| 2014/0353033 A1 | 12/2014 | Pink et al. |
| 2015/0029034 A1 | 1/2015 | Abbassian et al. |
| 2015/0039230 A1 | 2/2015 | Proett et al. |
| 2015/0043030 A1 | 2/2015 | Yamamoto |
| 2015/0053483 A1 | 2/2015 | Mebane |
| 2015/0105912 A1 * | 4/2015 | Dykstra .................. E21B 47/00 700/275 |
| 2015/0211359 A1 | 7/2015 | Tapie et al. |
| 2015/0241871 A1 | 8/2015 | Yoshino et al. |
| 2015/0247397 A1 | 9/2015 | Samuel |
| 2015/0281516 A1 | 10/2015 | Matsui |
| 2015/0294258 A1 | 10/2015 | Hildebrand et al. |
| 2015/0331971 A1 | 11/2015 | Scollard et al. |
| 2015/0345262 A1 | 12/2015 | Kpetehoto et al. |
| 2015/0365635 A1 | 12/2015 | Jose et al. |
| 2015/0369014 A1 | 12/2015 | Weatherhead et al. |
| 2015/0369030 A1 | 12/2015 | Hay et al. |
| 2016/0024906 A1 | 1/2016 | Jamison et al. |
| 2016/0047220 A1 | 2/2016 | Sharp et al. |
| 2016/0053604 A1 | 2/2016 | Abbassian et al. |
| 2016/0076357 A1 | 3/2016 | Hbaieb |
| 2016/0084076 A1 | 3/2016 | Fanini et al. |
| 2016/0186531 A1 | 6/2016 | Harkless et al. |
| 2016/0186551 A1 | 6/2016 | Dykstra |
| 2016/0208603 A1 | 7/2016 | Barfoot et al. |
| 2016/0230530 A1 | 8/2016 | Dykstra et al. |
| 2016/0275133 A1 | 9/2016 | Moore |
| 2016/0321330 A1 | 11/2016 | Ziegler et al. |
| 2016/0333673 A1 | 11/2016 | Anno et al. |
| 2016/0358120 A1 | 12/2016 | Moore et al. |
| 2017/0064045 A1 | 3/2017 | Pai et al. |
| 2017/0101826 A1 | 4/2017 | Sigmar et al. |
| 2017/0122092 A1 | 5/2017 | Harmer |
| 2017/0134422 A1 | 5/2017 | Shieh et al. |
| 2017/0223005 A1 | 8/2017 | Birgisson et al. |

(56) References Cited

U.S. PATENT DOCUMENTS

| | | |
|---|---|---|
| 2017/0289824 A1 | 10/2017 | Figoli et al. |
| 2017/0315544 A1 | 11/2017 | Tateno |
| 2018/0320512 A1 | 11/2018 | Anisur Rahman et al. |
| 2018/0351952 A1 | 12/2018 | Rojas et al. |
| 2018/0355700 A1 | 12/2018 | Zheng et al. |
| 2018/0359130 A1 | 12/2018 | Zheng et al. |
| 2018/0359339 A1 | 12/2018 | Zheng et al. |
| 2019/0041182 A1 | 2/2019 | Samuel |
| 2019/0203591 A1 | 7/2019 | Disko et al. |
| 2019/0226332 A1 | 7/2019 | Vehra et al. |

FOREIGN PATENT DOCUMENTS

| | | |
|---|---|---|
| WO | 2016102381 A1 | 6/2016 |
| WO | WO-2016102381 A1 * | 6/2016 |
| WO | 2016168596 A1 | 10/2016 |
| WO | 2017011585 A1 | 1/2017 |

* cited by examiner

WELL CONSTRUCTION COMMUNICATION AND CONTROL

CROSS-REFERENCE TO RELATED APPLICATIONS

This application is a continuation of the U.S. application Ser. No. 15/621,107 filed on 13 Jun. 2017 entitled Well Construction Communication and Control, which application is hereby incorporated by reference in its entirety.

BACKGROUND OF THE DISCLOSURE

In the drilling of oil and gas wells, drilling rigs are used to create a well by drilling a wellbore into a formation to reach oil and gas deposits (e.g., hydrocarbon deposits). During the drilling process, as the depth of the wellbore increases, so does the length and weight of the drillstring. A drillstring may include sections of drill pipe, a bottom hole assembly, and other tools for creating a well. The length of the drillstring may be increased by adding additional sections of drill pipe as the depth of the wellbore increases. Various components of a drilling rig can be used to advance the drillstring into the formation.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a first processing system having a processor and a memory including computer program code. The first processing system is operable to receive a job plan developed by a second processing system, and implement the job plan, including generating commands for one or more equipment controllers based on the job plan. The one or more equipment controllers are operable to control equipment of a well construction system. The first processing system is also operable to transmit, through a network, the commands to the one or more equipment controllers for execution of the commands by the one or more equipment controllers. The first processing system is also operable to iteratively: (i) monitor, through the network, current conditions of the well construction system during execution of commands by the one or more equipment controllers; (ii) update the implementation of the job plan, including generating updated commands for the one or more equipment controllers based on the job plan and on the current conditions of the well construction system when the current conditions of the well construction system indicate a deviation from the implementation; and (iii) transmit, through the network, the updated commands to the one or more equipment controllers for execution of the updated commands by the one or more equipment controllers.

The present disclosure also introduces an apparatus including a network, one or more equipment controllers communicatively coupled to the network and operable to control equipment of a well construction system, and a first processing system communicatively coupled to the network and having a processor and a memory including computer program code. The first processing system is operable to develop a job plan based on current conditions of the well construction system, and to transmit the job plan through the network. The apparatus also includes a second processing system communicatively coupled to the network and having a processor and a memory including computer program code. The second processing system is operable to receive the job plan through the network, implement the job plan including generating commands for the one or more equipment controllers based on the job plan, and transmit, through the network, the commands to the one or more equipment controllers for execution of the commands by the one or more equipment controllers. The second processing system is also operable to iteratively: (a) monitor, through the network, the current conditions of the well construction system during execution of commands by the one or more equipment controllers; (b) update the implementation of the job plan, including generating updated commands for the one or more equipment controllers based on the job plan and on the current conditions of the well construction system when the current conditions of the well construction system indicate a deviation from the implementation; and (c) transmit, through the network, the updated commands to the one or more equipment controllers for execution of the updated commands by the one or more equipment controllers.

The present disclosure also introduces a method including operating a first processing system comprising a processor and a memory including computer program code. Operating the first processing system includes receiving a job plan developed by a second processing system, implementing the job plan including generating commands for one or more equipment controllers based on the job plan. The one or more equipment controllers are operable to control equipment of a well construction system. Operating the first processing also includes transmitting, through a network, the commands to the one or more equipment controllers for execution of the commands by the one or more equipment controllers. Operating the first processing also includes iteratively: (i) monitoring, through the network, current conditions of the well construction system during execution of commands by the one or more equipment controllers; (ii) updating the implementation of the job plan, including generating updated commands for the one or more equipment controllers based on the job plan and on the current conditions of the well construction system when the current conditions of the well construction system indicate a deviation from the implementation; and (iii) transmitting, through the network, the updated commands to the one or more equipment controllers for execution of the updated commands by the one or more equipment controllers.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
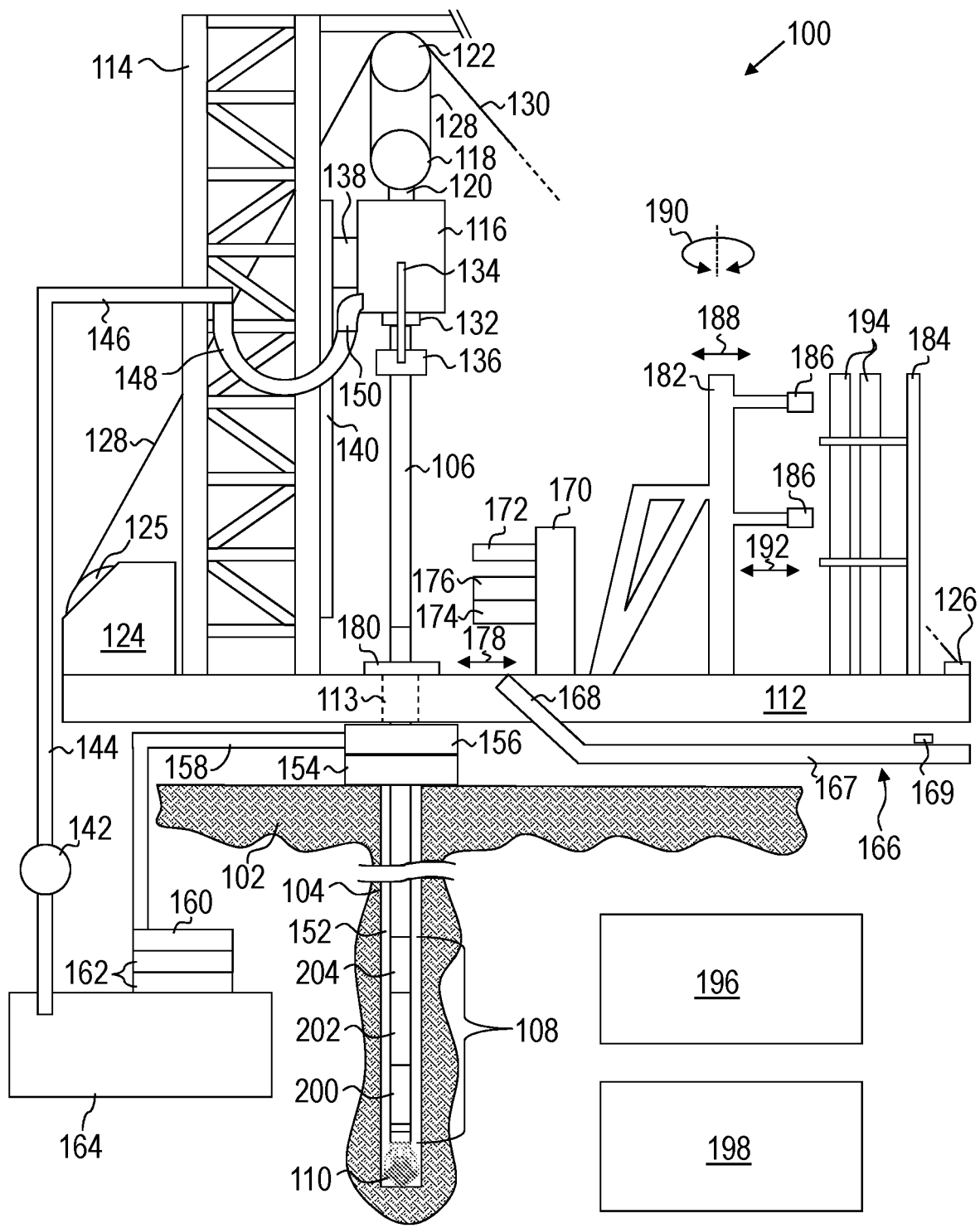
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

Systems and methods and/or processes according to one or more aspects of the present disclosure may be used or performed in connection with well construction at a wellsite, such as construction of a wellbore to obtain hydrocarbons (e.g., oil and/or gas) from a formation, including drilling the wellbore. For example, some aspects of the present disclosure may be described in the context of drilling a wellbore in the oil and gas industry, although one or more aspects of the present disclosure may also or instead be used in other systems. Various subsystems used in constructing the wellsite may have sensors and/or controllable components that are communicatively coupled to one or more equipment controllers (ECs). An EC can include a programmable logic controller (PLC), an industrial computer, a personal computer based controller, a soft PLC, the like, and/or an example controller configured and operable to (1) perform sensing of an environmental status and/or (2) control equipment. Sensors and various other components may transmit sensor data and/or status data to an EC, and controllable components may receive commands from an EC to control operations of the controllable components. One or more aspects disclosed herein may permit communication between ECs of different subsystems through virtual networks and/or a common data bus. Sensor data and/or status data may be communicated between ECs of different subsystems through virtual networks and a common data bus. Additionally, a coordinated controller can implement control logic to issue commands to various ones of the ECs through the virtual networks and common data bus to thereby control operations of one or more controllable components. Additional details of example implementations are described below. A person having ordinary skill in the art will readily understand that one or more aspects of systems and methods and/or processes disclosed herein may be used in other contexts, including other systems.

FIG. 1 is a schematic view of at least a portion of an example implementation of a well construction system 100 operable to drill a wellbore 104 into a subsurface formation 102 at a wellsite in accordance with one or more aspects of the present disclosure. A drillstring 106 penetrates the wellbore 104 and includes a bottom hole assembly (BHA) 108 that comprises or is mechanically and hydraulically coupled to a drill bit 110. The well construction system 100 includes a mast 114 (a portion of which is depicted in FIG. 1) extending from a rig floor 112 that is erected over the wellbore 104. A top drive 116 is suspended from the mast 114 and is detachably, mechanically, and hydraulically coupled to the drillstring 106. The top drive 116 provides a rotational force (e.g., torque) to drive rotational movement of the drillstring 106 when advancing the drillstring 106 into the formation 102 to form the wellbore 104.

The top drive 116 is suspended from the mast 114 via hoisting equipment. The hoisting equipment includes a traveling block 118 with a hook or other means 120 for mechanically coupling the traveling block 118 to the top drive 116. The hoisting equipment also includes a crown block 122 attached to the mast 114, a drawworks 124 anchored to the rig floor 112 and comprising a drum 125, a deadline anchor 126 attached to the rig floor 112, and a drill line 128 extending from the deadline anchor 126, around the crown block 122 and the traveling block 118, and to the drawworks 124 where the excess length is spooled around the drum 125. The portion of the drill line 128 extending from the deadline anchor 126 to the crown block 122 is referred to as the deadline 130 (a portion of which being depicted in FIG. 1 in phantom).

The crown block 122 and the traveling block 118 collectively comprise a system of pulleys or sheaves around which the drill line 128 is reeved. The drawworks 124 comprises the drum 125 and an engine, motor, or other prime mover (not shown). The drawworks 124 may also comprise a control system and/or one or more brakes, such as a mechanical brake (e.g., a disk brake), an electrodynamic brake, and/or the like, although the prime mover and/or control system may instead provide the braking function. The prime mover of the drawworks 124 drives the drum 125 to rotate and reel in the drill line 128, which causes the traveling block 118 and the top drive 116 to move upward away from the rig floor 112. The drawworks 124 can reel out the drill line 128 by a controlled rotation of the drum 125 using the prime mover and control system, and/or by disengaging the prime mover (such as with a clutch) and disengaging and/or operating one or more brakes to control the release of the drill line 128. Unreeling the drill line 128 from the drawworks 124 causes the traveling block 118 and the top drive 116 to move downward toward the rig floor 112.

Implementations within the scope of the present disclosure include land-based rigs, as depicted in FIG. 1, as well as offshore implementations. In offshore implementations, the hoisting equipment may also include a motion or heave compensator between the mast 114 and the crown block 122 and/or between the traveling block 118 and the hook 120, among other possible additional components.

The top drive 116 includes a drive shaft 132, a pipe handling assembly 134 with an elevator 136, and various other components not shown in FIG. 1, such as a prime mover and a grabber. The drillstring 106 is mechanically coupled to the drive shaft 132 (e.g., with or without a sub saver between the drillstring 106 and the drive shaft 132). The prime mover drives the drive shaft 132, such as through a gearbox or transmission, to rotate the drive shaft 132 and, therefore, the drillstring 106. The pipe handling assembly 134 and the elevator 136 permit the top drive 116 to handle tubulars (e.g., single, double, or triple stands of drill pipe and/or casing) that are not mechanically coupled to the drive shaft 132. The grabber includes a clamp that clamps onto a tubular when making up and/or breaking out a connection of a tubular with the drive shaft 132. A guide system (e.g., rollers, rack-and-pinion elements, and/or other mechanisms) may include a guide 140 affixed or integral to the mast 114, and a dolly 138 integral to or otherwise carried with the top drive 116 up and down the guide 140. The guide system may provide torque reaction, such as to prevent rotation of the top drive 116 while the prime mover is rotating the drive shaft 132. The guide system may also or instead aid in maintaining alignment of the top drive 116 with an opening 113 in the rig floor 112 through which the drillstring 106 extends.

A drilling fluid circulation system circulates oil-based mud (OBM), water-based mud (WBM), and/or other drilling fluid to the drill bit 110. A pump 142 delivers drilling fluid through, for example, a discharge line 144, a standpipe 146, and a hose 148 to a port 150 of the top drive 116. The drilling fluid is then conducted through the drillstring 106 to the drill bit 110, exiting into the wellbore 104 via ports in the drill bit 110. The drilling fluid then circulates upward through an annulus 152 defined between the outside of the drillstring 106 and the wall of the wellbore 104 (or the wall of casing installed in the wellbore 104, if applicable). In this manner, the drilling fluid lubricates the drill bit 110 and carries formation cuttings up to the surface as the drilling fluid is circulated.

At the surface, the drilling fluid may be processed for recirculation. For example, the drilling fluid may flow through a blowout preventer 154 and a bell nipple 156 that diverts the drilling fluid to a return flowline 158. The return flowline 158 may direct the drilling fluid to a shale shaker 160 that removes at least large formation cuttings from the drilling fluid. The drilling fluid may then be directed to reconditioning equipment 162, such as may remove gas and/or finer formation cuttings from the drilling fluid. The reconditioning equipment 162 can include a desilter, a desander, a degasser, and/or other components.

After treatment by the reconditioning equipment 162, the drilling fluid may be conveyed to one or more mud tanks 164. Intermediate mud tanks may also be used to hold drilling fluid before and/or after the shale shaker 160 and/or various ones of the reconditioning equipment 162. The mud tank(s) 164 can include an agitator to assist in maintaining uniformity (e.g., homogeneity) of the drilling fluid contained therein. A hopper (not depicted) may be disposed in a flowline between the mud tank(s) 164 and the pump 142 to disperse an additive, such as caustic soda, in the drilling fluid.

A catwalk 166 can be used to convey tubulars from a ground level to the rig floor 112. The catwalk 166 has a horizontal portion 167 and an inclined portion 168 that extends between the horizontal portion 167 and the rig floor 112. A skate 169 may be positioned in a groove and/or other alignment means in the horizontal and inclined portions of the catwalk 166. The skate 169 can be driven along the groove by a rope, chain, belt, and/or other pulley system (not depicted), thereby pushing tubulars up the inclined portion 168 of the catwalk 166 to a position at or near the rig floor 112 for subsequent engagement by the elevator 136 of the top drive 116 and/or other pipe handling means. However, other means for transporting tubulars from the ground to the rig floor 112 are also within the scope of the present disclosure. One or more pipe racks (not shown) may also adjoin the horizontal portion 167 of the catwalk 166, and may include or operate in conjunction with a tubular delivery unit and/or other means for transferring tubulars to the horizontal portion 167 of the catwalk 166 in a mechanized and/or automated manner.

An iron roughneck 170 is also disposed on the rig floor 112. The iron roughneck 170 comprises a spinning system 172 and a torque wrench comprising a lower gripper 174 and an upper gripper 176. The iron roughneck 170 is moveable (e.g., in a translation movement 178) to approach the drillstring 106 (e.g., for making up and/or breaking out a connection of the drillstring 106) and to move clear of the drillstring 106. The spinning system 172 applies low-torque spinning to threadedly engage or disengage a threaded connection between tubulars of the drillstring 106, and the torque wrench applies a higher torque to ultimately make up or initially break out the threaded connection.

Manual, mechanized, and/or automated slips 180 are also disposed on and/or in the rig floor 112. The drillstring 106 extends through the slips 180. In mechanized and/or automated implementations of the slips 180, the slips 180 can be actuated between open and closed positions. In the open position, the slips 180 permit advancement of the drillstring 106 through the slips 180. In the closed position, the slips 180 clamp the drillstring 106 to prevent advancement of the drillstring 106, including with sufficient force to support the weight of the drillstring 106 suspended in the wellbore 104.

To form the wellbore 104 (e.g., "make hole"), the hoisting equipment lowers the top drive 116, and thus the drillstring 106 suspended from the top drive 116, while the top drive 116 rotates the drillstring 106. During this advancement of the drillstring 106, the slips 180 are in the open position, and the iron roughneck 170 is clear of the drillstring 106. When the upper end of the tubular in the drillstring 106 that is made up to the top drive 116 nears the slips 180, the hoisting equipment ceases downward movement of the top drive 116, the top drive 116 ceases rotating the drillstring 106, and the slips 180 close to clamp the drillstring 106. The grabber of the top drive 116 clamps the upper portion of the tubular made up to the drive shaft 132. The drive shaft 132 is driven via operation of the prime mover of the top drive 116 to break out the connection between the drive shaft 132 and the drillstring 106. The grabber of the top drive 116 then releases the tubular of the drillstring 106, and the hoisting equipment raises the top drive 116 clear of the "stump" of the drillstring 106 extending upward from the slips 180.

The elevator 136 of the top drive 116 is then pivoted away from the drillstring 106 towards another tubular extending up through the rig floor 112 via operation of the catwalk 166. The elevator 136 and the hoisting equipment are then operated to grasp the additional tubular with the elevator 136. The hoisting equipment then raises the additional tubular, and the elevator 136 and the hoisting equipment are then operated to align and lower the bottom end of the additional tubular to proximate the upper end of the stump.

The iron roughneck 170 is moved 178 toward the drillstring 106, and the lower gripper 174 clamps onto the stump of the drillstring 106. The spinning system 172 then rotates the suspended tubular to engage a threaded (e.g., male) connector with a threaded (e.g., female) connector at the top end of the stump. Such spinning continues until achieving a predetermined torque, number of spins, vertical displacement of the additional tubular relative to the stump, and/or other operational parameters. The upper gripper 176 then clamps onto and rotates the additional tubular with a higher torque sufficient to complete making up the connection with the stump. In this manner, the additional tubular becomes part of the drillstring 106. The iron roughneck 170 then releases the drillstring 106 and is moved 178 clear of the drillstring 106.

The grabber of the top drive 116 then grasps the drillstring 106 proximate the upper end of the drillstring 106. The drive shaft 132 is moved into contact with the upper end of the drillstring 106 and is rotated via operation of the prime mover to make up a connection between the drillstring 106 and the drive shaft 132. The grabber then releases the drillstring 106, and the slips 180 are moved into the open position. Drilling may then resume.

FIG. 1 also depicts a pipe handling manipulator (PHM) 182 and a fingerboard 184 disposed on the rig floor 112, although other implementations within the scope of the present disclosure may include one or both of the PHM 182 and the fingerboard 184 located elsewhere or excluded. The fingerboard 184 provides storage (e.g., temporary storage) of tubulars 194, such that the PHM 182 can be operated to transfer the tubulars 194 from the fingerboard 184 for inclusion in the drillstring 106 during drilling or tripping-in operations, instead of (or in addition to) from the catwalk 166, and similarly for transferring tubulars 194 removed from the drillstring 106 to the fingerboard 184 during tripping-out operations.

The PHM 182 includes arms and clamps 186 collectively operable for grasping and clamping onto a tubular 194 while the PHM 182 transfers the tubular 194 to and from the drillstring 106, the fingerboard 184, and the catwalk 166. The PHM 182 is movable in at least one translation direction 188 and/or a rotational direction 190 around an axis of the PHM 182. The arms of the PHM 182 can extend and retract along direction 192.

The tubulars 194 conveyed to the rig floor 112 via the catwalk 166 (such as for subsequent transfer by the elevator 136 and/or the PHM 182 to the drillstring 106 and/or the fingerboard 184) may be single joints and/or double- or triple-joint stands, such as may be assembled prior to being fed onto the catwalk 166. In other implementations, the catwalk 166 may include means for making/breaking the multi-joint stands.

The multi-joint stands may also be made up and/or broken out via cooperative operation of two or more of the top drive 116, the drawworks 124, the elevator 136, the catwalk 166, the iron roughneck 170, the slips 180, and the PHM 182. For example, the catwalk 166 may position a first joint (drill pipe, casing, etc.) to extend above the rig floor 112 or another orientation where the joint can be grasped by the elevator 136. The top drive 116, the drawworks 124, and the elevator 136 may then cooperatively transfer the first joint into the wellbore 104, where the slips 180 may retain the first joint. The catwalk 166 may then position a second joint that will be made up with the first joint. The top drive 116, the drawworks 124, and the elevator 136 may then cooperatively transfer the second joint to proximate the upper end of the first joint extending up from the slips 180. The iron roughneck 170 may then make up the first and second joints to form a double stand. The top drive 116, the drawworks 124, the elevator 136, and the slips 180 may then cooperatively move the double stand deeper into the wellbore 104, and the slips 180 may retain the double stand such that an upper end of the second joint extends upward. If the contemplated drilling, casing, or other operations are to utilize triple stands, the catwalk 166 may then position a third joint to extend above the rig floor 112, and the top drive 116, the drawworks 124, and the elevator 136 may then cooperatively transfer the third joint to proximate the upper end of the second joint extending up from the slips 180. The iron roughneck 170 may then make up the second and third joints to form a triple stand. The top drive 116 (or the elevator 136) and the drawworks 124 may then cooperatively lift the double or triple stand out of the wellbore 104. The PHM 182 may then transfer the stand from the top drive 116 (or the elevator 136) to the fingerboard 184, where the stand may be stored until retrieved by the PHM 182 for the drilling, casing, and/or other operations. This process of assembling stands may generally be performed in reverse to disassemble the stands.

A power distribution center 196 is also at the wellsite. The power distribution center 196 includes one or more generators, one or more AC-to-DC power converters, one or more DC-to-AC power inverters, one or more hydraulic systems, one or more pneumatic systems, the like, or a combination thereof. The power distribution center 196 can distribute AC and/or DC electrical power to various motors, pumps, and other components of the well construction system 100. Similarly, the power distribution center 196 can distribute pneumatic and/or hydraulic power to various components of the well construction system 100. Components of the power distribution center 196 can be centralized in the well construction system 100 or can be distributed among several locations within the well construction system 100.

A control center 198 is also at the wellsite. The control center 198 houses one or more processing systems of a network of the well construction system 100. Details of the network of the well construction system 100 are described below. Generally, various equipment of the well construction system 100, such as the drilling fluid circulation system, the hoisting equipment, the top drive 116, the PHM 182, the catwalk 166, etc., can have various sensors and controllers to monitor and control the operations of that equipment. Additionally, the control center 198 can receive information regarding the formation and/or downhole conditions from modules and/or components of the BHA 108.

The BHA 108 can comprise various components with various capabilities, such as measuring, processing, and storing information. The BHA 108 may include a telemetry device 109 for communications with the control center 198. The BHA 108 shown in FIG. 1 is depicted as having a modular construction with specific components in certain modules. However, the BHA 108 may be unitary, or select portions thereof may be modular. The modules and/or components therein may be positioned in a variety of configurations within the BHA 108.

For example, the BHA 108 may comprise one or more measurement-while-drilling (MWD) modules 200 that may include tools operable to measure wellbore trajectory, wellbore temperature, wellbore pressure, and/or other example properties. The BHA 108 may comprise one or more logging-while-drilling (LWD) modules 202 that may include tools operable to measure formation parameters and/or fluid properties, such as resistivity, porosity, permeability, sonic velocity, optical density, pressure, temperature, and/or other example properties. The BHA 108 may comprise one or more sampling-while-drilling (SWD) modules 204 for communicating a formation fluid through the BHA 108 and obtaining a sample of the formation fluid. The SWD module(s) 204 may comprise gauges, sensor, monitors and/or other devices that may also be utilized for downhole sampling and/or testing of a formation fluid.

A person having ordinary skill in the art will readily understand that well construction systems other than the example depicted in FIG. 1 may include more, less, and/or different equipment than as described herein and/or depicted in the figures, but may still be within the scope of the present disclosure. Additionally, various equipment and/or systems of the well construction systems within the scope of the present disclosure may include more, less, and/or different equipment than as described herein and/or depicted in the figures. For example, various engines, motors, hydraulics, actuators, valves, or the like that are not described herein and/or depicted in the figures may be included in other implementations of equipment and/or systems also within the scope of the present disclosure. The well construction systems within the scope of the present disclosure may also be implemented as land-based rigs or offshore rigs.

The equipment and/or systems of well construction systems within the scope of the present disclosure may be transferrable via land-based movable vehicles, such as trucks and/or trailers. For example, the mast 114, the PHM 182 (and associated frame), the drawworks 124, the fingerboard 184, the power distribution center 196, the control center 198, the mud tanks 164 (and associated pump 142, shale shaker 160, and reconditioning equipment 162), and the catwalk 166, among other examples, may each be transferrable by a separate truck and trailer combination. Some of the equipment and/or systems may be collapsible to accommodate transfer on a trailer. For example, the mast 114, the fingerboard 184, the catwalk 166, and/or other equipment and/or systems may be telescopic, folding, and/or otherwise collapsible. Other equipment and/or systems may be collapsible by other techniques, or may be separable into subcomponents for transportation purposes.

Figure 2:
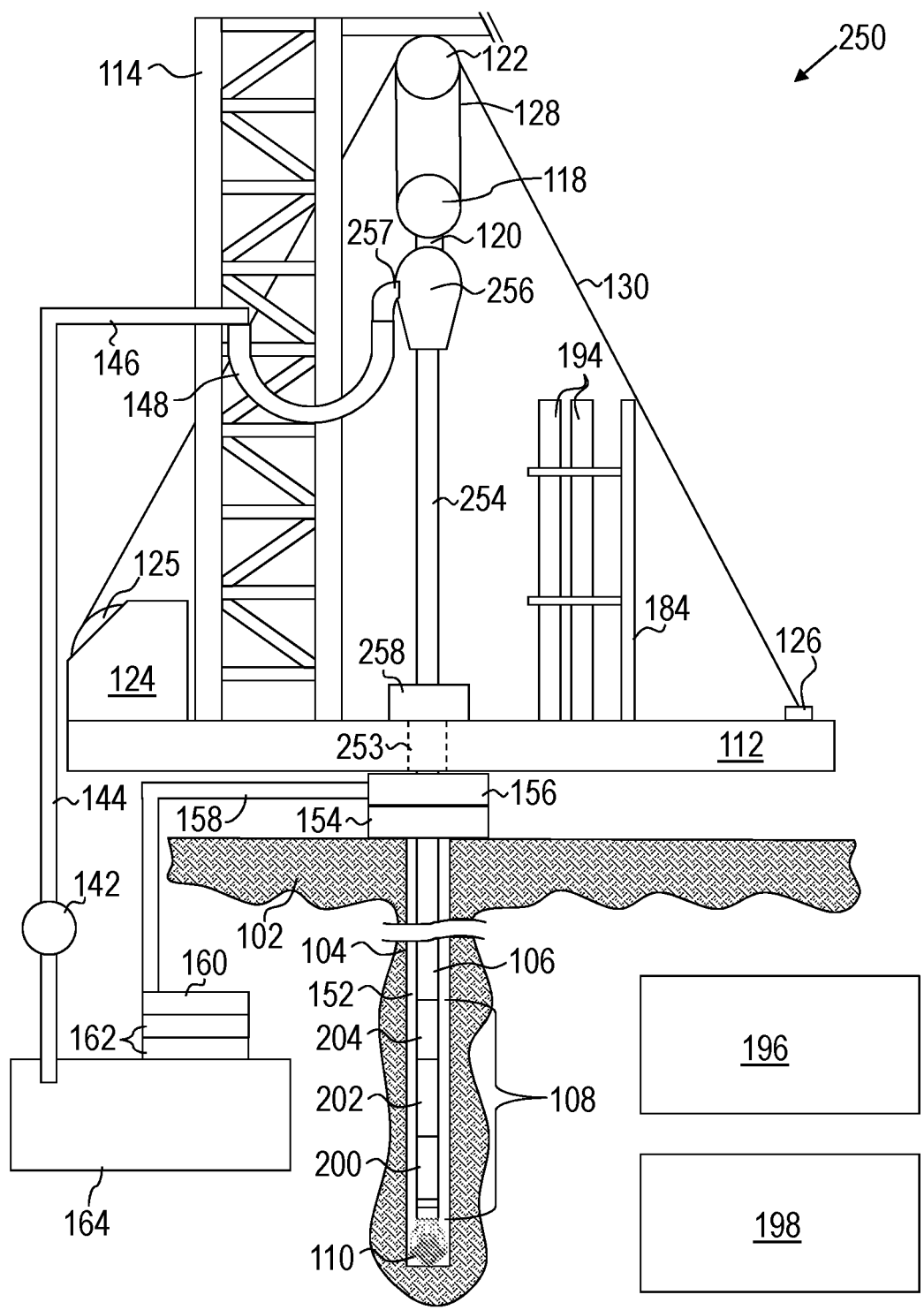
FIG. 2 is a schematic view of at least a portion of an example implementation of apparatus according to one or more aspects of the present disclosure.

FIG. 2 is a schematic view of at least a portion of another example implementation of a well construction system 250 operable to drill a wellbore 104 into a subsurface formation 102 at a wellsite in accordance with one or more aspects of the present disclosure. Some of the components and operation of those components are common (as indicated by usage of common reference numerals) between the well construction systems 100 and 250 of FIGS. 1 and 2, respectively. Hence, description of the common components may be omitted here for brevity, although a person of ordinary skill in the art will readily understand the components and their operation in the well construction system 250 of FIG. 2.

A swivel 256 and kelly 254 are suspended from the mast 114 via the hoisting equipment. The hook 120 mechanically couples with the swivel 256, although other means for coupling the traveling block 118 with the swivel 256 are also within the scope of the present disclosure. The kelly 254 is detachably mechanically coupled to the drillstring 106. A kelly spinner is between the kelly 254 and the swivel 256, although not specifically illustrated. The kelly 254 extends through an opening 253 through a master bushing (not specifically depicted) in the rig floor 112 and a kelly bushing 258 that engages the master bushing and the kelly 254. The rig floor 112 includes a rotary table that includes the master bushing and a prime mover. The prime mover of the rotary table, through the master bushing and the kelly bushing 258, provides a rotational force to drive rotational movement of the drillstring 106 to form the wellbore 104.

Similar to as described above with respect to FIG. 1, the pump 142 delivers drilling fluid through, for example, the discharge line 144, the standpipe 146, and the hose 148 to a port 257 of the swivel 256. The drilling fluid is then conducted through the kelly 254 and the drillstring 106 to the drill bit 110.

Although not illustrated, tongs, a cathead, and/or a spinning wrench or winch spinning system may be used for making up and/or breaking out connections of tubulars. A winch spinning system may include a chain, rope, or the like that is driven by a winch. The spinning wrench or winch spinning system may be operable for applying low-torque spinning to make up and/or break out a threaded connection between tubulars of the drillstring 106. For example, with a winch spinning system, a human roughneck can wrap a chain around a tubular, and the chain is pulled by the winch to spin the tubular to make up and/or break out a connection. The tongs and cathead can be used to apply higher torque to make up and/or break out the threaded connection. For example, a human roughneck can manually apply tongs to tubulars, and the cathead mechanically coupled to the tongs (such as by chains) can apply a high torque to make up and/or break out the threaded connection.

Removable slips may be used in securing the drillstring 106 when making up and/or breaking out a connection. For example, a human operator may place the slips between the drillstring 106 and the rig floor 112 and/or the master bushing of the rotary table to suspend the drillstring 106 in the wellbore 104 during make up and/or break out.

To form the wellbore 104 (e.g., "make hole"), the hoisting equipment lowers the drillstring 106 while the prime mover of the rotary table rotates the drillstring 106 via the master bushing and kelly bushing 258. During this advancement of the drillstring 106, removable slips are removed from the opening 253, and the tongs are clear of the drillstring 106. When the upper end of the kelly 254 nears the kelly bushing 258 and/or rig floor 112, the hoisting equipment ceases downward movement of the kelly 254, and the rotary table ceases rotating the drillstring 106. The hoisting equipment raises the kelly 254 until the upper end of the drillstring 106 protrudes from the master bushing and/or rig floor 112, and the slips are placed in the opening 253 between the drillstring 106 and the master bushing and/or rig floor 112 to clamp the drillstring 106. When the kelly 254 is raised, a flange at the bottom of the kelly 254 can grasp the kelly bushing 258 to clear the kelly bushing 258 from the master bushing. Human operators can then break out the connection between the kelly 254 and the drillstring 106 using the tongs and cathead for applying a high torque, and the prime mover of the rotary table can cause the drillstring 106 to rotate to spin out of the connection to the kelly 254, for example.

A tubular may be positioned in preparation to being made up to the kelly 254 and the drillstring 106. For example, a tubular may be manually transferred to a mouse hole in the rig floor 112. Other methods and systems for transferring a tubular may be used.

With the connection between the drillstring 106 and the kelly 254 broken out, the hoisting equipment maneuvers the kelly 254 into a position such that a connection between the kelly 254 and the tubular projecting through the mouse hole can be made up. Operators can then make up the connection between the kelly 254 and the tubular by spinning the kelly 254 with the kelly spinner and by using the tongs and cathead. The hoisting equipment then raises and maneuvers the kelly 254 and attached tubular into a position such that a connection between the attached tubular and drillstring 106 can be made up. Operators can then make up the connection between the tubular and the drillstring 106 by clamping one of the tongs to the tubular and spinning the kelly 254 with the kelly spinner and by using the tongs and cathead. The slips are then removed from the opening 253, and the drillstring 106 and kelly 254 are lowered by the hoisting equipment until the drill bit 110 engages the one or more subsurface formations 102. The kelly bushing 258 engages the master bushing and the kelly 254. Drilling may then resume.

A power distribution center 196 and control center 198 are also at the wellsite as described above. The control center 198 houses one or more processing systems of a network of the well construction system 250. Details of the network of the well construction system 250 are described below. Generally, various equipment of the well construction system 250, such as the drilling fluid circulation system, the hoisting equipment, the rotary table, etc., can have various sensors and controllers to monitor and control the operations of that equipment. Additionally, the control center 198 can receive information regarding the formation and/or downhole conditions from modules and/or components of the BHA 108. The BHA 108 can comprise various components with various capabilities, such as measuring, processing, and storing information, as described above.

A person having ordinary skill in the art will readily understand that a well construction system may include more or fewer equipment than as described herein and/or depicted in the figures. Additionally, various equipment and/or systems of the example implementation of the well construction system 250 depicted in FIG. 2 may include more or fewer equipment. For example, various engines, motors, hydraulics, actuators, valves, or the like that were not described above and/or depicted in FIG. 2 may be included in other implementations of equipment and/or systems also within the scope of the present disclosure.

Additionally, the well construction system 250 of FIG. 2 may be implemented as a land-based rig or on an offshore rig. One or more aspects of the well construction system 250 of FIG. 2 may be incorporated in and/or omitted from a land-based rig or an offshore rig. Such modifications are within the scope of the present disclosure.

One or more equipment and/or systems of the well construction system 250 of FIG. 2 may be transferrable via a land-based movable vessel, such as a truck and/or trailer. For example, the mast 114, the drawworks 124, the fingerboard 184, the power distribution center 196, the control center 198, mud tanks 164 (and associated pump 142, shale shaker 160, and reconditioning equipment 162), and/or other examples may each be transferrable by a separate truck and trailer combination. Some of the equipment and/or systems may be collapsible to accommodate transfer on a trailer. For example, the mast 114, the fingerboard 184, and/or other equipment and/or systems may be telescopic, folding, and/or otherwise collapsible. Other equipment and/or systems may be collapsible by other techniques, or may be separable into subcomponents for transportation purposes.

The well construction systems 100 and 250 of FIGS. 1 and 2, respectively, illustrate various example equipment and systems that may be incorporated in a well construction system. Various other example well construction systems may include another combination of equipment and systems described with respect to the well construction systems 100 and 250 of FIGS. 1 and 2, respectively, and may omit some equipment and/or systems and/or include additional equipment and/or systems not specifically described herein. Such well construction systems are within the scope of the present disclosure.

Figure 3:
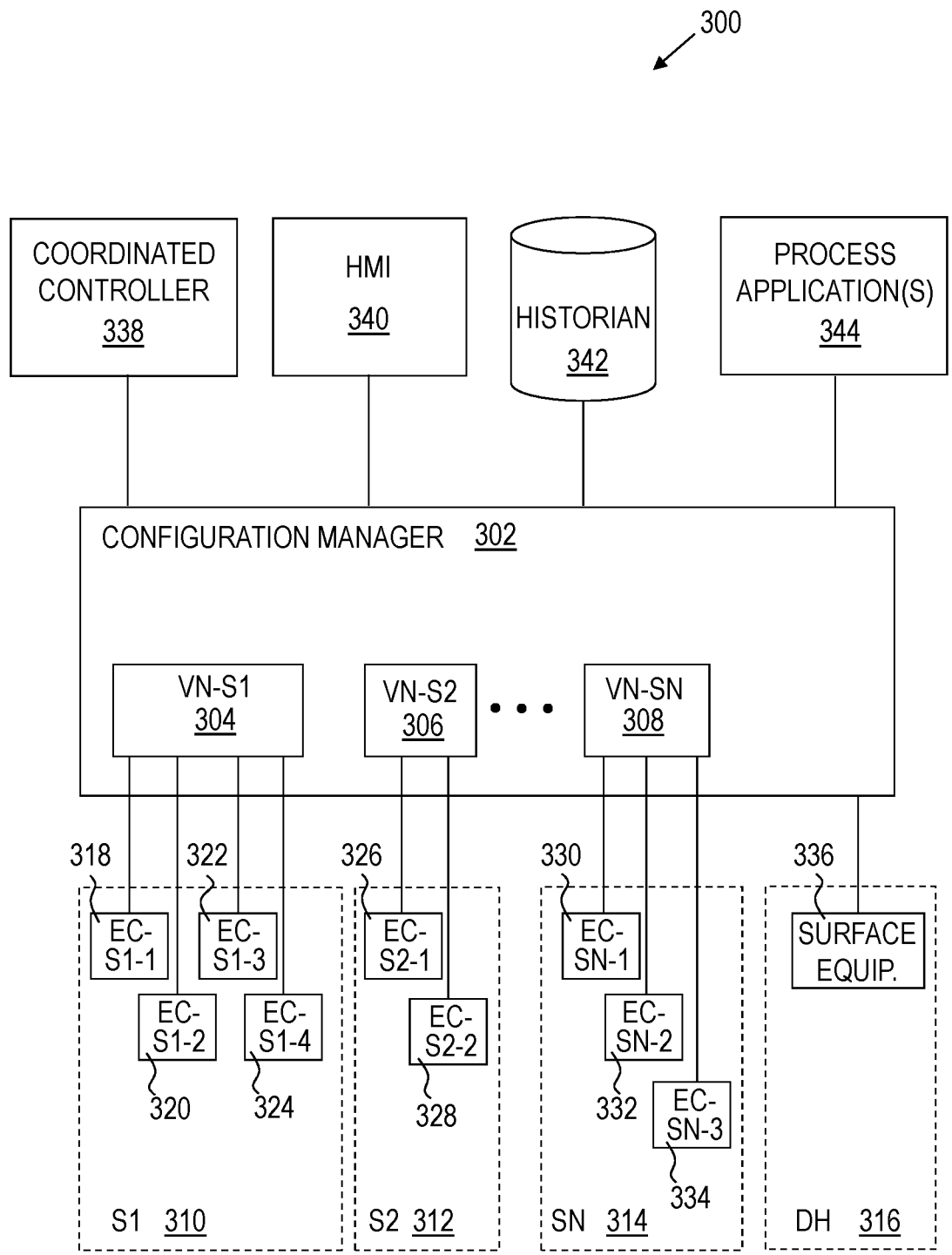
FIG. 3 is a schematic view of at least a portion of an example implementation of apparatus according to one or more aspects of the present disclosure.

FIG. 3 is a schematic view of at least a portion of an example implementation of an operations network 300 according to one or more aspects of the present disclosure. The physical network used to implement the operations network 300 of FIG. 3 can have a network topology, such as a bus topology, a ring topology, a star topology, and/or mesh topology, among other examples also within the scope of the present disclosure. The operations network 300 can include one or more processing systems, such as one or more network appliances (like a switch or other processing system), that are configured to implement various virtual networks, such as virtual local area networks (VLANs). Additionally, the operations network 300 can include one or more processing systems, such as one or more network appliances (like a switch or other processing system), that are configured with an intrusion detection system (IDS) to monitor traffic across the operations network 300, such as may be in respective virtual networks. The IDS can alert personnel to potential cyber security breaches that may occur on the operations network 300.

The operations network 300 includes a configuration manager 302, which may be a software program instantiated and operable on one or more processing systems, such as one or more network appliances. The configuration manager 302 may be a software program written in and compiled from a high-level programming language, such as C/C++ or the like. As described in further detail below, the configuration manager 302 is operable to translate communications from various communications protocols to a common communication protocol and make the communications translated to the common communication protocol available through a common data bus, and vice versa. The common data bus may include an application program interface (API) of the configuration manager 302 and/or a common data virtual network (VN-DATA) implemented on one or more processing systems, such as network appliances like switches.

The configuration manager 302 can have predefined classes for objects to implement the translations of communication. Instantiated objects in the configuration manager 302 for subsystems can be used to receive communications from the subsystems according to respective (and possibly different) communication protocols implemented by the subsystems, and to translate the communications to a common protocol, which is made available on the common data bus, and vice versa. The classes can define objects at the subsystem level (e.g., drilling control system, drilling fluid circulation system, cementing system, etc.), the equipment level (e.g., top drive, drawworks, drilling fluid pump, etc.), and/or the data level (e.g., type of commands, sensor data, and/or status data). Hence, an object can be instantiated for each instance of a subsystem, equipment, and/or data type depending on how the class of the object was defined. Further, the classes can define objects based on the communication protocols to be implemented by the subsystems. Hypothetically, assuming two subsystems that are identical except that each implements a different communication protocol, the configuration manager 302 may instantiate objects for the subsystems from different classes that were defined based on the different communication protocols. Objects can be instantiated at set-up of the operations network 300 and/or by dynamically detecting ECs and/or subsystems.

As will become apparent from description below, using a configuration manager, such as the configuration manager 302 in FIG. 3, may permit simpler deployment of subsystems in a well construction system and associated communications equipment, for example. The use of a software program compiled from a high-level language may permit deployment of an updated version of a configuration manager when an additional, previously undefined subsystem is deployed, which may alleviate deployment of physical components associated with the configuration manager (e.g., when adding equipment/subsystems to the well construction system). Further, applications that access data from the configuration manager (e.g., through the common data bus) can be updated through a software update when new data becomes available by the addition of a new subsystem, such that the updated application can consume data generated by the new subsystem.

One or more processing systems of the operations network 300, such as one or more switches and/or other network appliances, are configured to implement one or more subsystem virtual networks (e.g., VLANs), such as a first subsystem virtual network (VN-S1) 304, a second subsystem virtual network (VN-S2) 306, and an Nth subsystem virtual network (VN-SN) 308 as illustrated in FIG. 3. More or fewer subsystem virtual networks may be implemented. The subsystem virtual networks (e.g., VN-S1 304, VN-S2 306, and VN-SN 312) are logically separate from each other. The subsystem virtual networks can be implemented according to the IEEE 802.1Q standard, another standard, or a proprietary implementation. Each subsystem virtual network can implement communications with the EC(s) of the respective subsystem based on various protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol. Further, the subsystem virtual networks can implement publish-subscribe communications. The subsystem virtual networks can implement the same protocol, each subsystem virtual network can implement a different protocol, or a combination therebetween.

In the example depicted in FIG. 3, a first control subsystem (S1) 310, a second control subsystem (S2) 312, and an Nth control subsystem (SN) 314 are various control subsystems of a well construction system. Example subsystems include a drilling fluid circulation system (which may include mud pumps, valves, fluid reconditioning equipment, etc.), a rig control system (which may include hoisting equipment, drillstring rotary mover equipment (such as a top drive and/or rotary table), a PHM, a catwalk, etc.), a managed pressure drilling system, a cementing system, a rig walk system, etc. A subsystem may include a single piece of equipment, or may include multiple pieces of equipment that, for example, are jointly used to perform one or more functions. Each subsystem includes one or more ECs, which may control equipment of the subsystem and/or receive sensor and/or status data from sensors and/or equipment of the subsystem. In the example depicted in FIG. 3, the S1 310 includes a first S1 EC (EC-S1-1) 318, a second S1 EC (EC-S1-2) 320, a third S1 EC (EC-S1-3) 322, and a fourth S1 EC (EC-S1-4) 324. The S2 312 includes a first S2 EC (EC-S2-1) 326 and a second S2 EC (EC-S2-2) 328. The SN 314 includes a first SN EC (EC-SN-1) 330, a second SN EC (EC-SN-2) 332, and a third SN EC (EC-SN-3) 334. Other numbers of control subsystems may be implemented, and other numbers of ECs may be used in each control subsystem. Some example control subsystems are described below following description of various aspects of FIG. 3.

Each EC can implement logic to monitor and/or control one or more sensors and/or one or more controllable components of the respective subsystem. Each EC can include logic to interpret a command and/or other data, such as from one or more sensors or controllable components, and to communicate a signal to one or more controllable components of the subsystem to control the one or more controllable components in response to the command and/or other data. Each EC can also receive a signal from one or more sensors, and can reformat the signal (e.g., from an analog signal to a digital signal) into interpretable data. The logic for each EC can be programmable, such as compiled from a low-level programming language, such as described in IEC 61131 programming languages for PLCs, structured text, ladder diagram, functional block diagrams, functional charts, or the like.

As also illustrated in the example depicted in FIG. 3, a downhole system (DH) 316 is an example sensor system of the well construction system. The DH 316 includes surface equipment 336 that is communicatively coupled to a bottom hole assembly (BHA) on a drillstring (e.g., the BHA 108 of the drillstring 106 in FIGS. 1 and 2). The surface equipment 336 receives (e.g., via telemetry equipment) data from the BHA, such as data relating to conditions in the wellbore, conditions of the subterranean formation 102, and/or conditions/parameters of components of the BHA, among other examples. The surface equipment 336 in this example does not control operations of equipment. Other sensor subsystems may also or instead be included in the operations network 300.

The operations network 300 includes a coordinated controller 338, which may be a software program instantiated and operable on one or more processing systems, such as one or more network appliances. The coordinated controller 338 may be a software program written in and compiled from a high-level programming language, such as C/C++ or the like. The coordinated controller 338 can control operations of subsystems and communications as described in further detail below.

The operations network 300 also includes one or more human-machine interfaces (HMIs), such as the HMI 340 in the example implementation depicted in FIG. 3. The HMI 340 may be, comprise, or be implemented by one or more processing systems with a keyboard, a mouse, a touchscreen, a joystick, one or more control switches or toggles, one or more buttons, a track-pad, a trackball, an image/code scanner, a voice recognition system, a display device (such as a liquid crystal display (LCD), a light-emitting diode (LED) display, and/or a cathode ray tube (CRT) display), a printer, speaker, and/or other examples. A human operator may use the HMI 340 for entry of commands to the coordinated controller 338, and the HMI 340 may permit visualization or other sensory perception of various data, such as sensor data, status data, and/or other example data. The HMI may be a part of a control subsystem, and may issue commands through a subsystem virtual network to one or more of the ECs of that subsystem virtual network without using the coordinated controller 338. Each HMI can be associated with and control a single or multiple subsystems. An HMI may also or instead control an entirety of the system that includes each subsystem.

The operations network 300 also includes a historian 342, which may be a database maintained and operated on one or more processing systems, such as database devices, for example. The historian 342 may be distributed across multiple processing systems and/or may be maintained in memory, which can include external storage, such as a hard disk or drive. The historian 342 may access sensor data and/or status data, which is stored and maintained in the historian 342.

The operations network 300 further includes one or more process applications 344, which may each or collectively be a software program instantiated and operable on one or more processing systems, such as one or more server devices and/or other network appliances. The process applications 344 may each be a software program written in and compiled from a high-level programming language, such as C/C++ or the like. The process applications 344 may analyze data and output one or more job plans to the coordinated controller 338, and/or may monitor data that is accessible and/or consumed from the common data bus. An example of the process applications 344 can include a drilling operation plan, and another example can include a cementing operation plan. Various job plans can be self-contained, or can refer to one or more other plans.

Processing systems that process data for control of various subsystems can have resources dedicated for such processing. For example, the one or more processing systems on which the coordinated controller 338 operates, the one or more processing systems on which the configuration manager 302 operates, the one or more processing systems that are configured to implement the virtual networks, and/or other processing systems may have resources dedicated to processing and communicating commands and/or sensor and/or status data used to determine appropriate commands to issue. By dedicating resources in this manner, control of processes in the well construction system may be real-time. Other communications and processing may be may be handled in a non-real-time manner without using dedicated resources.

Referring to communications within the operations network 300, each EC within a control subsystem can communicate with other ECs in that control subsystem through the subsystem virtual network for that control subsystem (e.g., through processing systems configured to implement the subsystem virtual network). Sensor data, status data, and/or commands from an EC in a subsystem can be communicated to another EC within that subsystem through the subsystem virtual network for that subsystem, for example, which may occur without intervention of the coordinated controller 338. As an example from the example operations network 300 depicted in FIG. 3, EC-S1-1 318 can communicate sensor data, status data, and/or commands to EC-S1-3 322 via VN-S1 304, and vice versa, without intervention of the coordinated controller 338. Other ECs within a subsystem can similarly communicate through their respective subsystem virtual network.

Communications from a subsystem virtual network to another processing system outside of that subsystem and respective subsystem virtual network can be translated from the communications protocol used for that subsystem virtual network to a common protocol (e.g., data distribution service (DDS) protocol or other examples) by the configuration manager 302. The communications that are translated to a common protocol may also be available to other processing systems via the common data bus, for example. Sensor data and/or status data from the control subsystems (e.g., S1 310, S2 312, and SN 314) may be available (e.g., directly available) for consumption by ECs of different subsystems, the coordinated controller 338, the HMI 340, the historian 342, and/or the process applications 344 via the common data bus. ECs may also communicate sensor data and/or status data to another EC in another subsystem via the common data bus. For example, if a sensor in the S1 310 communicates a signal to the EC-S1-1 318, and the data generated from that sensor is also used by the EC-S2-1 326 in the S2 312 to control one or more controllable components of the S2 312, the sensor data can be communicated from the EC-S1-1 318 via the VN-S1 304, the common data bus, and the VN-S2 306 to the EC-S2-1 326. Other ECs within various subsystems can similarly communicate sensor data and/or status data through the common data bus to one or more other ECs in different subsystems. Similarly, for example, if one or more of the process applications 344 consume data generated by a sensor coupled to the EC-S1-1 318 in the S1 310, the sensor data can be communicated from the EC-S1-1 318 via the VN-S1 304 and the common data bus, where the one or more process applications 344 can access and consume the sensor data.

Similarly, communications from a sensor subsystem (e.g., the DH 316) can be translated from the communications protocol used for that sensor subsystem to the common protocol by the configuration manager 302. The communications that are translated to a common protocol can be made available to other processing systems via the common data bus, for example. Similar to above, sensor data and/or status data from the sensor subsystem may be available (e.g., directly available) for consumption by ECs of control subsystems, the coordinated controller 338, the HMI 340, the historian 342, and/or the process applications 344 via the common data bus.

The coordinated controller 338 can also implement logic to control operations of the well construction system. The coordinated controller 338 can monitor various statuses of components and/or sensors and can issue commands to various ECs to control the operation of the controllable components within one or more subsystems. Sensor data and/or status data can be monitored by the coordinated controller 338 via the common data bus, and the coordinated controller 338 can issue commands to one or more ECs via the respective subsystem virtual network of the EC.

The coordinated controller 338 can implement logic to generate commands based on a job plan from one or more process applications 344, and to issue those commands to one or more ECs in one or more subsystems. The one or more process applications 344 may communicate a generalized command to the coordinated controller 338, such as through the common data bus. The generalized command may include an intended general operation (e.g., drilling into a formation) and defined constraints of parameters that can affect the operation. For example, the defined constraints for a drilling operation may include a desired function of rate of penetration (ROP) of the drilling related to a top drive revolutions per minute (RPM) and weight on bit (WOB). The coordinated controller 338 may interpret the generalized command and translate it to specified commands (that are interpretable by appropriate ECs) that are then issued to ECs to control various controllable components.

The coordinated controller 338 can further monitor the status of various equipment and/or sensor data to optimize operations of equipment of subsystems based on the status and/or sensor data that is fed back. By feeding back and monitoring data of the environment of the well construction, the coordinated controller 338 can continuously update commands to account for a changing environment. For example, if the ROP is greater or less than anticipated by the plan, the coordinated controller 338 can calculate and issue commands to increase or decrease one or both of top drive RPM and WOB.

Similarly, one or more of the process applications 344 can monitor status and/or sensor data available through the common data bus to monitor a progression of an operation, and/or to update a job plan based on a changing environment. If the operation progresses as planned within the various constraints, for example, the process applications 344 may not update the job plan and can permit operations to continue based on the job plan that is being implemented. If the operation progresses differently from what was planned, which may be indicated by the status and/or sensor data, the process applications 344 may alter the job plan and communicate the altered job plan to the coordinated controller 338 for implementation.

Figure 4:
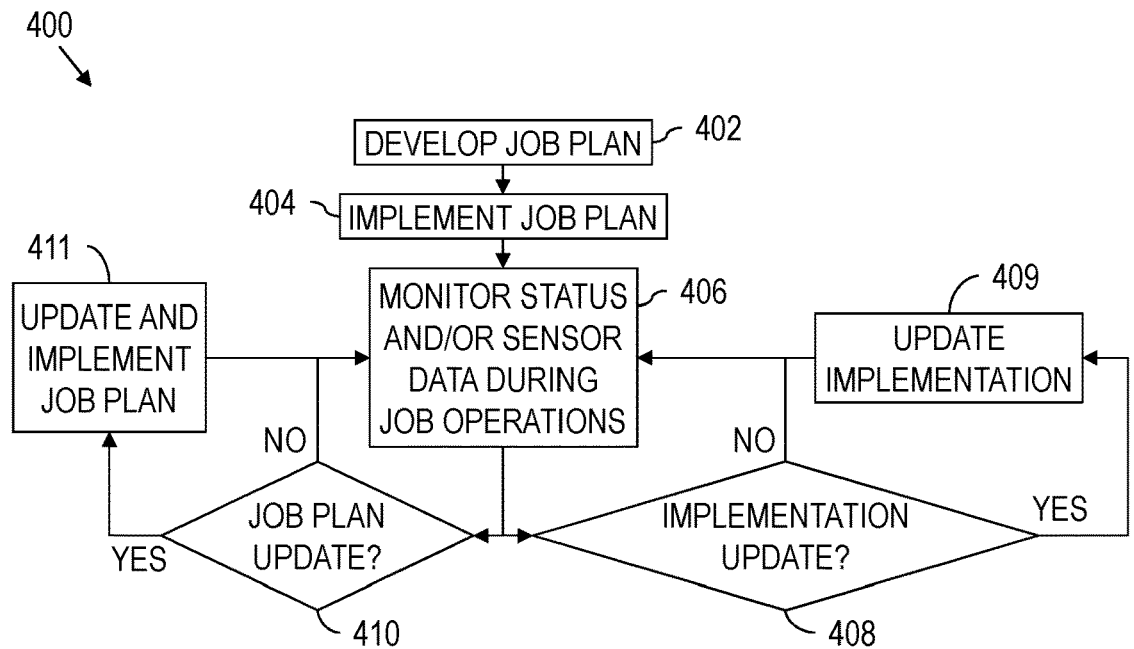
FIG. 4 is a flow-chart diagram of at least a portion of an example implementation of a method according to one or more aspects of the present disclosure.

FIG. 4 is a flow-chart diagram of at least a portion of an example implementation of a method (400) for controlling operations of a well construction system according to one or more aspects of the present disclosure. The method (400) may be performed by, utilizing, or otherwise in association with one or more features depicted in one or more of FIGS. 1-3 described above, one or more features depicted in FIGS. 7 and/or 9 described below, and/or one or more features otherwise within the scope of the present disclosure. However, for the sake of simplicity, the method (400) is described below in the context of the example implementation depicted in FIG. 3 and/or otherwise described above, and a person having ordinary skill in the art will recognize that the following description of the method (400) is also applicable or readily adaptable for operations networks other than the example operations network 300 depicted in FIG. 3.

The method (400) may include developing (402) a job plan, such as by one or more of the process applications 344. The job plan may be developed (402) based on geological and/or geophysical data measured or otherwise believed to be descriptive of the target formation(s) of the well being constructed, and/or one or more geological, geophysical, and/or engineering databases. The developed (402) job plan may include details pertaining to the trajectory of the well, the mud to be used during drilling, casing design, drill bits, BHA components, and the like.

The method (400) includes implementing (404) the job plan, such as by the coordinated controller 338 as described above. Implementing (404) the job plan may comprise operating (and/or causing the operation of) the well construction system to form the well according to the developed (402) job plan. The operation details (e.g., WOB, top drive RPM, mud flow rate, etc.) may be determined during the development (402) and/or implementation (404) of the job plan.

The method (400) also includes monitoring (406) status and/or sensor data, such as by one or more of the process applications 344 and the coordinated controller 338, as the job operations continue. The method (400) also includes determining (408) whether the implementation of the job plan should be updated based on the monitored (406) status and/or sensor data. The coordinated controller 338 may perform the determination (408). The determination (410) may be based on one or more indications in (or derived from) the monitored (406) status and/or sensor data that the operations are deviating from an intended progression of the job plan implementation (404), and/or that the initial job plan implementation (404) was faulty in light of new data. If the determination (408) is that the implementation will not be updated, operations continue while monitoring (406) the status and/or sensor data, such as by the coordinated controller 338. If the determination (408) is that the implementation will be updated, the existing job plan implementation (404) is updated (409) based on the monitored (406) status and/or sensor data, such as by the coordinated controller 338. The status and/or sensor data monitoring (406) and job operations then continue.

The method (400) also comprises determining (410) whether the job plan should be updated based on the monitored (406) status and/or sensor data. One or more of the process applications 344 may perform the determination (410). The determination (410) may be based on one or more indications in (or derived from) the monitored (406) status and/or sensor data that the operations are deviating from an anticipated progression of the job plan, and/or that the initially developed (402) job plan was faulty in light of new data. If the determination (410) is that the job plan will not be updated, operations continue while monitoring (406) the status and/or sensor data, such as by one or more of the process applications 344. If the determination (410) is that the job plan will be updated, the job plan is updated (based on the monitored (406) status and/or sensor data) and implemented (411), such as by one or more of the process applications 344. The status and/or sensor data monitoring (406) and job operations then continue. The method (400) may continue until the initially developed (402) or updated (411) job plan is completed.

Developing a job plan may be calculation intensive, and may thus be developed over a longer period of time, which may not be real-time to the operations. The coordinated controller 338 (e.g., the one or more processing systems on which the coordinated controller 338 operates) may have resources (e.g., processing resources) dedicated to control of various systems, which permit such control to be real-time (e.g., within a known, determinable period of time). Further, the implementation may be updated by simpler processes, which may permit real-time updates to the implementation. The real-time updates may permit optimized control of operations being implemented by a job plan.

The coordinated controller 338 can control issuance of commands to ECs generated in response to an actor outside of the ECs' respective subsystem virtual networks. Thus, for example, the HMI 340 can issue a command to one or more ECs in a subsystem through the common data bus under the control of the coordinated controller 338 and through the subsystem virtual network of that subsystem. For example, a user may input commands through the HMI 340 to control an operation of a subsystem. Commands to an EC of a subsystem from an actor outside of that subsystem may be prohibited in the operations network 300 without the coordinated controller 338 processing the command. The coordinated controller 338 can implement logic to determine whether a given actor (e.g., the HMI 340 and/or process applications 344) can cause a command to be issued to a given EC in a subsystem.

The coordinated controller 338 can implement logic to arbitrate commands that would control the operation of a particular equipment or subsystem, such as when there are multiple actors (e.g., job plans and/or HMIs) attempting to cause commands to be issued to the same equipment or subsystem at the same time. The coordinated controller 338 can implement an arbiter (e.g., logic) to determine which of conflicting commands from HMIs and/or job plans to issue to an EC. For example, if a first job plan attempts to have a command issued to the EC-SN-1 330 to increase a pumping rate of a pump, and a second job plan simultaneously attempts to have a command issued to the EC-SN-1 330 to decrease the pumping rate of the same pump, the arbiter of the coordinated controller 338 can resolve the conflict and determine which command is permitted to be issued. Additionally, as an example, if two HMIs issue conflicting commands simultaneously, the coordinated controller 338 can determine which command to prohibit and which command to issue.

The arbiter of the coordinated controller 338 may operate using a hybrid first in, first served and prioritization scheme. For example, the first command that is issued is permitted to operate to completion or until the actor that caused the command to be issued terminates the execution of that command. In some examples, a single, self-contained job plan that is to be executed alone without the execution of another job plan can generally be implemented without generating conflicting commands. However, a job plan may refer to another job plan, which may result in conflicting commands being generated. For example, a job plan for a cementing process can refer to a job plan for a drilling process in order to operate a pump, and by executing the job plan for the cementing process that refers to the job plan for the drilling process, multiple conflicting commands may be generated for the pump by operation of the two job plans. The arbiter handles these commands by permitting the first command that is generated by one of the job plans to be completed or until the generating job plan terminates the first command, even though a second subsequent and conflicting command is generated by the other of the job plans. The second command is placed in a queue until the first command is completed or terminated by its generating job plan, and then the arbiter permits the second command to be issued and executed.

Some actors within the operations network 300 may be assigned a priority that permits those actors to interrupt operations and/or commands regardless of the current state of the process. For example, an HMI can be assigned a high priority that permits a command from the HMI to interrupt an operation and/or command that is being executed. The command from the HMI may be executed, despite the current state of the process, until the command is completed or terminated by the sending HMI. After the command from the HMI has been executed, the process may return to its previous state or restart based on new conditions on which the job plan and/or implementation of the job plan is based.

Figure 5:
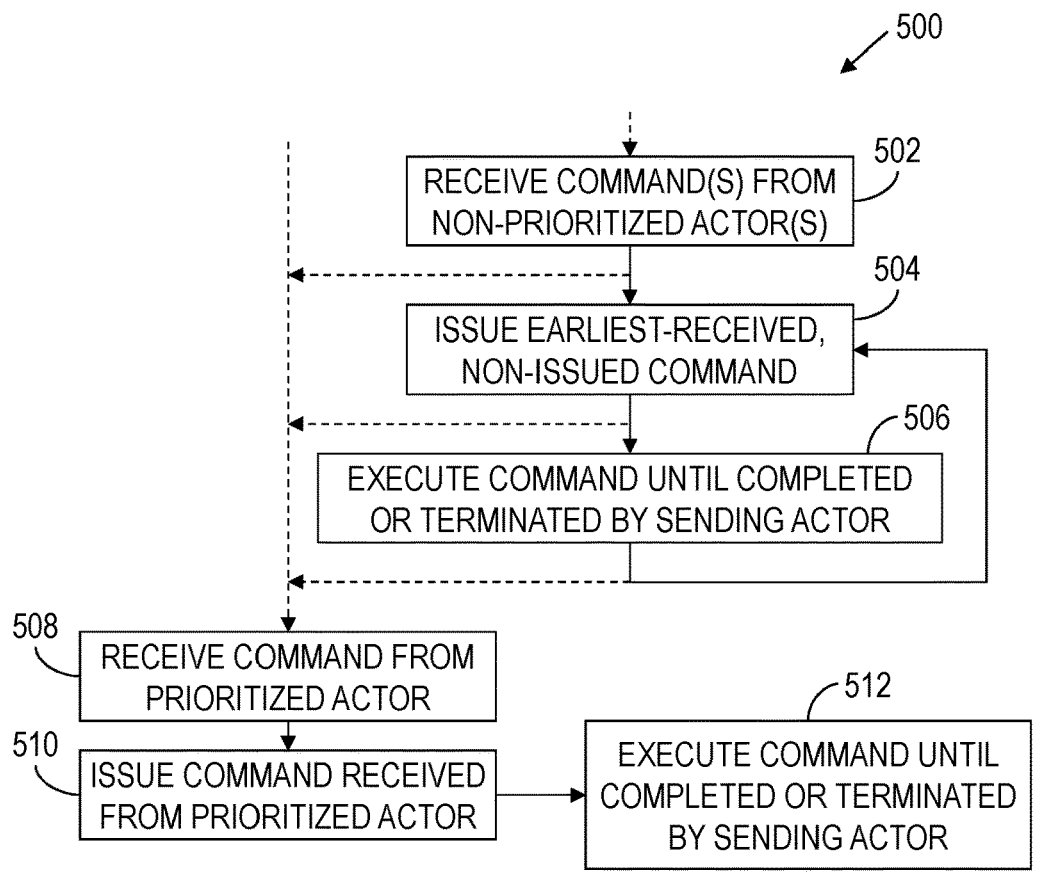
FIG. 5 is a flow-chart diagram of at least a portion of an example implementation of a method according to one or more aspects of the present disclosure.

FIG. 5 is a flow-chart diagram of at least a portion of an example implementation of a method (500) for controlling operations of a well construction system, including implementing an arbiter, according to one or more aspects of the present disclosure. The method (500) may be performed by, utilizing, or otherwise in association with one or more features depicted in one or more of FIGS. 1-3 described above, one or more features depicted in FIGS. 7 and/or 9 described below, and/or one or more features otherwise within the scope of the present disclosure. However, for the sake of simplicity, the method (500) is described below in the context of the example implementation depicted in FIG. 3 and/or otherwise described above, and a person having ordinary skill in the art will recognize that the following description of the method (500) is also applicable or readily adaptable for operations networks other than the example operations network 300 depicted in FIG. 3. Also, as described in more detail below, the method (500) may not flow linearly as illustrated in FIG. 5.

The method (500) includes receiving (502) one or more commands generated from one or more non-prioritized actors. For example, an arbiter can receive one or more commands that have been generated from one or more job plans, which may be non-prioritized. The method (500) includes issuing (504) the earliest received, non-issued command. For example, the arbiter can effectively queue commands from non-prioritized actors, and the first command received from a non-prioritized actor is the first command that is issued by the arbiter. The method (500) comprises executing (506) the issued command until the command is completed or terminated by the sending actor. The execution (506) of the issued command may be a discrete, instantaneous function by equipment, a function performed by equipment over a defined duration, a function performed by equipment until defined conditions are met (which may be indicated by the sending actor), and/or other example means of execution. The method (500) then loops back to issuing (504) the earliest received, non-issued command. During the issuance (504) and the execution (506), commands can continue to be received (502) from one or more non-prioritized actors, which commands are queued for issuance. Hence, the receiving (502), issuing (504), and executing (506) may implement a first in, first served type of queue.

During the receiving (502), issuing (504), and executing (506), the method (500) includes receiving (508) a command from a prioritized actor. The receipt (508) of a command from a prioritized actor interrupts the flow of the receiving (502), issuing (504), and executing (506) commands from non-prioritized actors, and hence, the command from the prioritized actor has priority over commands from non-prioritized actors. Example prioritized actors can include HMIs or others. The method (500) includes issuing (510) the command received from the prioritized actor, and executing (512) the issued command until the command is completed or terminated by the sending actor. The execution (512) of the issued command may be a discrete, instantaneous function by equipment, a function performed by equipment over a defined duration, a function performed by equipment until defined conditions are met (which may be indicated by the sending actor), and/or other example means of execution.

After the execution (512) of the command received (508) from the prioritized actor, the method (500) may resume at various instances. For example, after the execution (512), the method (500) may resume at the instance where the receipt (508) of the command from the prioritized actor interrupted the flow of the receiving (502), issuing (504), and executing (506) one or more commands received from one or more non-prioritized actors. Additionally, the execution (512) of the command received (508) from the prioritized actor can change conditions at the wellsite to an extent that non-prioritized actors withdraw previously sent commands and begin sending commands that are updated in response to the conditions that changed as a result of the execution (512) of the command from the prioritized actor. Thus, the method (500) may resume at receiving (502) one or more commands from one or more non-prioritized actors regardless of the instance when the receipt (508) of the command from the prioritized actor occurred.

In some examples of the implementation of the example method (500) of FIG. 5, the arbiter receives (502, 508) and issues (504, 510) the commands, which commands may be received from other logic of the coordinated controller 338 that implements one or more job plans received from one or more process applications 344. The arbiter can determine which commands the coordinated controller 338 is to issue to one or more ECs, and the ECs may execute (506, 512) the commands by controlling various equipment of the well construction system at the wellsite, for example. Other components and/or processing systems can implement various operations in other examples.

By permitting different subsystems to communicate as described above, a single clock may be used to synchronize multiple clocks of the processing systems of the operations network 300. For example, the coordinated controller 338 may periodically synchronize the clock of its one or more processing systems with a clock of a Global Positioning System (GPS) or other system. The coordinated controller 338 may then cause clocks of other processing systems of the operations network 300 to be synchronized with the clock of the coordinated controller 338. This synchronization process permits time stamps of, e.g., commands and sensor and/or status data to be synchronized to a single clock. This may permit improved control, in that conversion between clocks may be obviated for issuance of commands, for example. Further, data stored and maintained on the historian 342, for example, may be interpreted more easily by personnel.

When an additional subsystem is added to the operations network 300, and/or when an additional EC is added to an existing subsystem of the operations network 300, such that the new subsystem and/or EC is connected to the physical network, the configuration manager 302 may automatically instantiate one or more respective objects of the predefined classes corresponding to the new subsystem and/or EC to permit communications to and from the new subsystem and/or EC to be communicated through the common data bus. For example, after the operations network 300 is initiated and begins operation, a new (albeit predefined in the configuration manager 302) EC may subsequently be connected to the physical network of the operations network 300. The new EC may be for new equipment that is to become part of an existing subsystem, for equipment of a new subsystem, and/or for other situations. For example, a new EC for a new pump may be added to an existing drilling fluid circulation system, or a new EC for equipment may be added to create a new cementing system, among other examples. When the EC becomes connected to the physical network, the EC can communicate its presence through the physical network, such as by a multicast or broadcast message. The configuration manager 302 can receive the communication and, based on this communication (and possibly subsequent communications with the EC), the configuration manager 302 can instantiate a new object based on the type of equipment and/or subsystem with which the EC is used. After this object is instantiated, the EC can communicate through the common data bus to communicate sensor and/or status data to the common data bus and/or to receive commands through the common data bus.

The new subsystem and/or EC can be segmented into an existing virtual network or in a newly created virtual network. For example, during the set-up of the operations network 300, various unused ports of switches and/or other network appliances may be mapped to various virtual networks (e.g., VLANs), some of which virtual networks may be used upon initiating the operations network 300, and some of which may be allocated for future use upon initiating the operations network 300. The new EC can be connected to a previously unused port that is mapped to a virtual network that is in use for an existing subsystem for the EC to become part of that subsystem, or the new EC can be connected to a previously unused port that is mapped to a virtual network that was allocated for future use to create a new subsystem. In other example implementations, other segmentation techniques may be used, such as dynamic domain segmentation.

Figure 6:
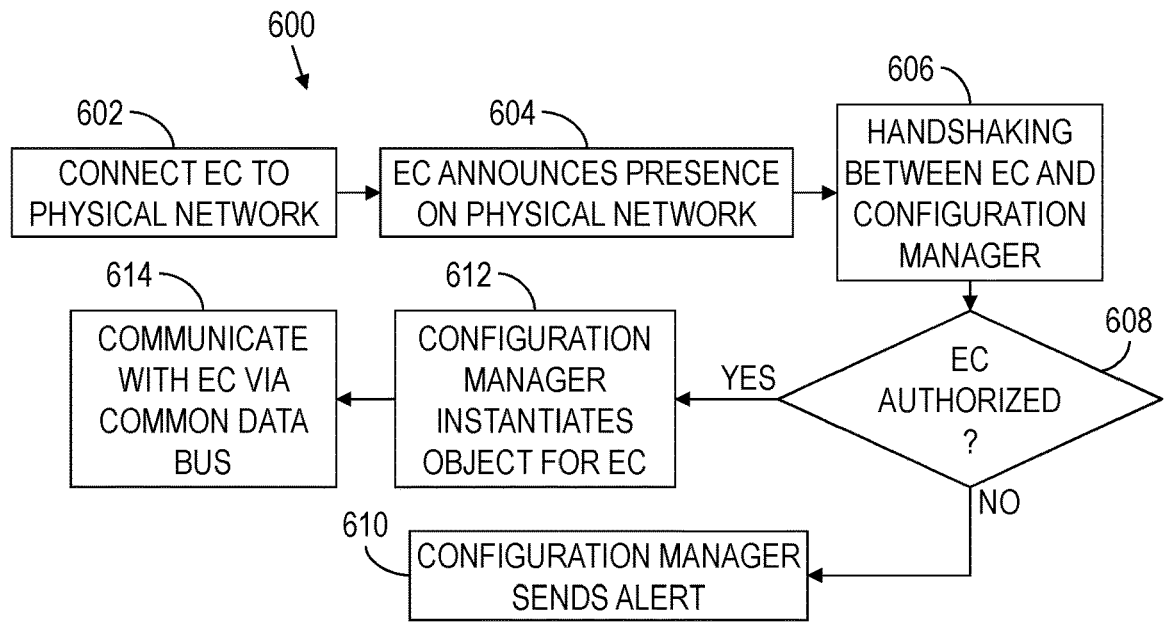
FIG. 6 is a flow-chart diagram of at least a portion of an example implementation of a method according to one or more aspects of the present disclosure.

FIG. 6 is a flow-chart diagram of at least a portion of an example implementation of a method (600) for connecting an EC (and/or similarly for connecting a subsystem) to an existing network of a well construction system according to one or more aspects of the present disclosure. The method (600) includes connecting (602) the EC to the physical network of the operations network 300. As described above, connecting (602) the EC can include connecting the EC to an existing port of a network appliance of the operations network 300, which may be configured to implement a virtual network.

The method (600) then includes announcing (604), by the EC (or another data processing system, such as one implementing a gateway when used in a different network), its presence on the physical network. The EC can announce (604) its presence by transmitting a multicast message, broadcast message, and/or other communication through the physical network. The configuration manager 302 receives the communication from the EC announcing (604) its presence, and then, the method (600) includes handshaking (606) between the EC and the configuration manager 302. The handshaking (606) can establish a communication channel between the EC and the configuration manager 302 and can further permit the EC to identify itself, such as including a type of equipment and/or subsystem with which the EC is associated. For example, the EC may establish that it is associated with a new pump that is to be a part of the existing drilling fluid circulation system.

The method (600) includes determining (608) whether the EC is authorized to be on the operations network 300. This may be part of the handshaking (606) between the EC and the configuration manager 302. The determination (608) may be based on one or more conditions. Example conditions that may cause the EC to be unauthorized can include that the EC and/or its associated equipment may not be recognizable by the configuration manager 302; addition of the EC and/or its associated equipment may exceed a specified number of ECs and/or associated equipment permitted for a subsystem; operating conditions of the well construction system may prohibit addition of the EC and/or its associated equipment; failure by the EC to transmit an authorization certificate accepted by the configuration manager; and/or other example conditions. If the determination (608) is that the EC is not authorized, the method (600) includes sending (610) an alert from the configuration manager 302. The alert can be to personnel devices to alert the personnel of an unauthorized device being connected to the operations network 300 and/or to one or more processing systems, such as one or more network appliances, to lock the EC out of the operations network 300. Other actions can also or instead be taken in response to the EC not being authorized.

If the determination (608) is that the EC is authorized, the method (600) includes instantiating (612) an object for the EC by the configuration manager 302. The object can correspond to a type of subsystem, control data, and/or sensor and/or status data with which the EC is associated, for example. The object can be in various forms, and can contain various information. Further, the object can be instantiated based on the protocol that the EC implements for communications. For example, translations of communications may differ depending on the protocol implemented between the configuration manager 302 and the EC. The configuration manager 302 may include predefined classes for instantiating various objects depending on the protocol used to communicate with the EC. With the object instantiated (612), the method (600) includes communicating (614) with the EC via the common data bus using the object to translate communications between the common data bus and the EC. For example, the EC can communicate sensor and/or status data to the common data bus using the object, which data can be consumed by, e.g., the coordinated controller 318, process applications 320, etc., and can receive commands from, e.g., the coordinated controller 318 through the common data bus using the object.

By dynamically detecting ECs and/or subsystems, various ECs and/or subsystems may be added to the well construction system more easily and transparent to job plan(s) and/or the coordinated controller. This may permit simpler deployment of the well construction system while being able to maintain robust communications and rich data throughout the network.

Other configurations of an operations network are also within the scope of the present disclosure. Different numbers of ECs, different numbers of subsystems and subsystem virtual networks, and different physical topologies and connections are also within the scope of the present disclosure. Additionally, other example implementations may include or omit an HMI and/or a historian, for example.

As an example subsystem, a drilling fluid circulation system can incorporate one or more ECs that control one or more controllable components. Controllable components in the drilling fluid circulation system may include one or more pumps (e.g., pump 142 in FIGS. 1 and 2), a shale shaker (e.g., shale shaker 160), a desilter, a desander, a degasser (e.g., reconditioning equipment 162), a hopper, various valves that may be on pipes and/or lines, and other components. For example, a pump may be controllable by an EC to increase/decrease a pump rate by increasing/decreasing revolutions of a prime mover driving the pump, and/or to turn the pump on/off. Similarly, a shale shaker may be controllable by an EC to increase/decrease vibrations of a grating, and/or to turn on/off the shale shaker. A degasser may be controllable by an EC to increase/decrease a pressure in the degasser by increasing/decreasing revolutions of a prime mover of a vacuum pump of the degasser, and/or to turn on/off the degasser. A hopper may be controllable by an EC to open/close a valve of the hopper to control the release of an additive (e.g., caustic soda) into a pipe and/or line through which drilling fluid flows. Further, various relief valves, such as a relief discharge value on a discharge line of a drilling fluid pump, a relief suction valve on an intake or suction line of a drilling fluid pump, or the like, may be controllable by an EC to be opened/closed (such as to relieve pressure). The controllable components may be controlled by a digital signal and/or analog signal from an EC. A person of ordinary skill in the art will readily envisage other example controllable components in a drilling fluid circulation system and how such components would be controllable by an EC, which are also within the scope of the present disclosure.

The drilling fluid circulation system may also incorporate one or more ECs that receive one or more signals from one or more sensors that are indicative of conditions in the drilling fluid circulation system. The one or more ECs that control one or more controllable components may be the same as, different from, or a combination therebetween of the one or more ECs that receive signals from sensors. Example sensors may include various flow meters and/or pressure gauges that may be fluidly coupled to various lines and/or pipes through which drilling fluid flows, such as the discharge line of a drilling fluid pump, the standpipe, the return line, the intake line of the drilling fluid pump, around various equipment, and/or the like. Using flow meters and/or pressure gauges, flow rates and/or pressure differentials may be determined that can indicate a leak in equipment, that a clog in equipment has occurred, that the formation has kicked, that drilling fluid is being lost to the formation, or the like. Various tachometers can be on various pumps and/or prime movers to measure speed and/or revolutions, such as of a drilling fluid pump, a vacuum pump of a degasser, a motor of an agitator of a mud tank, or the like. The tachometers can be used to measure the health of the respective equipment. A pressure gauge can be on the degasser to measure a pressure within the degasser. The degasser may operate at a predetermined pressure level to adequately remove gas from drilling fluid, and a pressure reading from a pressure gauge can be fed back to control the pressure within the degasser. A pit volume totalizer can be in one or more mud tanks to determine an amount of drilling fluid held by the mud tanks, which can indicate a leak in equipment, that a clog in equipment has occurred, that the formation has kicked, that drilling fluid is being lost to the formation, or the like. A viscometer can be along the circulation to measure viscosity of the drilling fluid, which can be used to determine remedial action, such as adding an additive to the drilling fluid at a hopper. Signals from such sensors can be sent to and received by one or more ECs, which can then transmit the sensor data to the common data bus and/or use the data to responsively control controllable components, for example. The signals from the sensor that are received by an EC may be a digital signal and/or analog signal. A person of ordinary skill in the art will readily envisage other example sensors in a drilling fluid circulation system and how such components would be coupled to an EC, which are also within the scope of the present disclosure.

As another example, a rig control system may incorporate one or more ECs that control one or more controllable components. Controllable components of the hoisting equipment may include a prime mover of the drawworks, one or more brakes, and others. For example, a prime mover of the drawworks may be controllable by an EC to increase/decrease a revolution rate of the prime mover of the drawworks, and/or to turn the prime mover on/off. A mechanical (and/or electronic) brake may be controllable by an EC to actuate the brake (e.g., a caliper and pad assembly) to clamp/release a brake disk of the drawworks, for example.

Controllable components in the drillstring rotary mover equipment may include a prime mover (e.g., including the top drive 116 in FIG. 1 and/or the rotary table depicted in FIG. 2), a gearbox and/or transmission, a pipe handler assembly and/or grabber, a kelly spinner, a torque wrench, mechanized and/or automated slips, and/or others. For example, the prime mover may be controllable by an EC to increase/decrease a revolution rate of the prime mover, and/or to turn the prime mover on/off. The gearbox and/or transmission may be controllable by an EC to set and/or change a gear ratio between the prime mover and the drive shaft or master bushing. The pipe handler assembly and/or grabber can be controllable by an EC to move the pipe handler assembly and/or grabber for receiving, setting, clasping, and/or releasing a tubular. The kelly spinner can be controllable by an EC to rotate a kelly when making up or breaking out a connection between the kelly and the drillstring. The torque wrench can be controllable by an EC to clamp and twist a tubular to make up a connection between the drive shaft and the tubular. The mechanized and/or automated slips can be controllable by an EC to open/close the slips.

The controllable components may be controlled by a digital signal and/or analog signal from an EC. A person of ordinary skill in the art will readily envisage other example controllable components in a rig control system and how such components would be controllable by an EC, which are also within the scope of the present disclosure.

The rig control system may also incorporate one or more ECs that receive one or more signals from one or more sensors that are indicative of conditions in the rig control system. The one or more ECs that control one or more controllable components may be the same as, different from, or a combination therebetween of the one or more ECs that receive signals from sensors. As some examples of sensors, a crown saver can be in a drawworks to determine and indicate when an excessive amount of drilling line has been taken in by the drawworks. An excessive amount of drilling line being taken in can damage hoisting equipment, such as by a traveling block impacting a crown block, and the signal from the crown saver can be fed back to indicate when the drawworks should cease taking in drilling line. A WOB sensor can be included on the traveling block, drawworks, deadline, other components/lines, and/or combinations thereof. The signal from the WOB sensor can be fed back to determine if too much or too little weight is on the bit of the drillstring, and in response, to determine whether to take in or reel out, respectively, drilling line. Further, a tachometer can be on a prime mover of the drawworks to measure speed and/or revolutions. The tachometer can be used to measure the health of the prime mover.

As further examples of sensors, various tachometers can be on the prime mover and/or drive shaft or master bushing of drillstring rotary mover equipment, and can be used to determine a rate of rotation of the respective prime mover and/or drive shaft or master bushing. A torque-on-bit sensor can be in a BHA. Various pressure gauges can be coupled to hydraulic systems used for the pipe handler assembly and/or grabber, the torque wrench, the slips, and/or other components.

Signals from such sensors can be sent to and received by one or more ECs, which can then transmit the sensor data to the common data bus and/or use the data to responsively control controllable components, for example. The signals from the sensor that are received by an EC may be a digital signal and/or analog signal. A person of ordinary skill in the art will readily envisage other example sensors in a rig control system and how such components would be coupled to an EC, which are also within the scope of the present disclosure.

A person of ordinary skill in the art will readily understand other example subsystems that may be in a well construction system, and that such other subsystems are also within the scope of the present disclosure. Such other subsystems may include a managed pressure drilling system, a cementing system, and/or a rig walk system, among other examples. A person of ordinary skill in the art will readily understand example EC(s), controllable component(s), and/or sensor(s) that can be used in these additional example systems. Additionally, a person of ordinary skill in the art will readily understand other example equipment and components that may be included in or omitted from example subsystems described herein.

Figure 7:
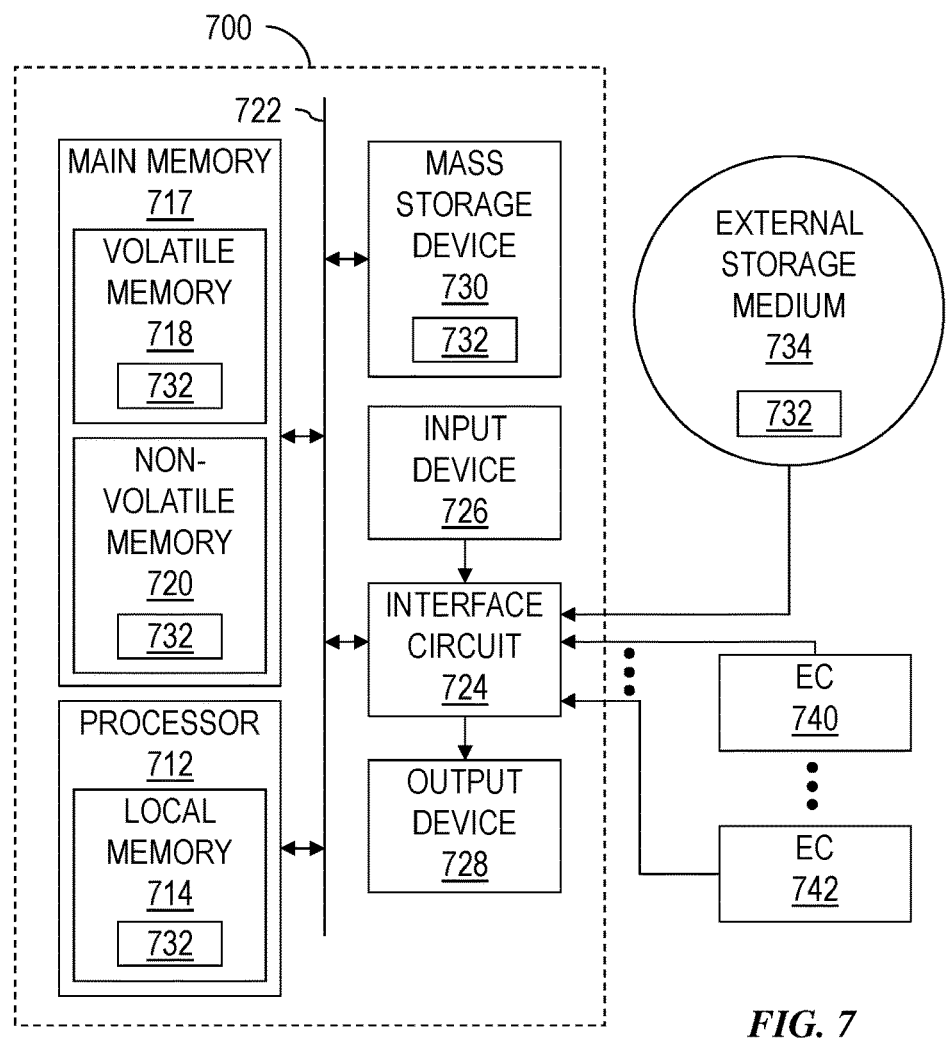
FIG. 7 is a schematic view of at least a portion of an example implementation of apparatus according to one or more aspects of the present disclosure.

FIG. 7 is a schematic view of at least a portion of an example implementation of a first processing system 700 according to one or more aspects of the present disclosure. The first processing system 700 may execute example machine-readable instructions to implement at least a portion of the configuration manager, coordinated controller, virtual networks, HMI, and/or historian described herein.

The first processing system 700 may be or comprise, for example, one or more processors, controllers, special-purpose computing devices, industrial computers, servers, personal computers, internet appliances, PLCs, and/or other types of computing devices. Moreover, while it is possible that the entirety of the first processing system 700 shown in FIG. 7 is implemented within one device, e.g., in the control center 198 of FIGS. 1 and 2, it is also contemplated that one or more components or functions of the first processing system 700 may be implemented across multiple devices, some or an entirety of which may be at the wellsite and/or remote from the wellsite of the well construction systems 100 and 250 of FIGS. 1 and 2, respectively.

The first processing system 700 comprises a processor 712 such as, for example, a general-purpose programmable processor. The processor 712 may comprise a local memory 714, and may execute program code instructions 732 present in the local memory 714 and/or in another memory device. The processor 712 may execute, among other things, machine-readable instructions or programs to implement the configuration manager, coordinated controller, process applications, and/or virtual networks described herein, for example. The programs stored in the local memory 714 may include program instructions or computer program code that, when executed by an associated processor, permit, cause, and/or embody implementation of the configuration manager, the coordinated controller, the virtual networks, an HMI, the process applications, and/or the historian as described herein. The processor 712 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific integrated circuits (ASICs), processors based on a multi-core processor architecture, and/or other processors. Examples of the processor 712 may include one or more INTEL microprocessors, microcontrollers from the ARM and/or PICO families of microcontrollers, and/or embedded soft/hard processors in one or more FPGAs, among other examples.

The processor 712 may be in communication with a main memory 717, such as via a bus 722 and/or other communication means. The main memory 717 may comprise a volatile memory 718 and a non-volatile memory 720. The volatile memory 718 may be, comprise, or be implemented by a tangible, non-transitory storage medium, such as random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 720 may be, comprise, or be implemented by a tangible, non-transitory storage medium, such as read-only memory (ROM), flash memory, and/or other types of memory devices. One or more memory controllers (not shown) may control access to the volatile memory 718 and/or the non-volatile memory 720.

The first processing system 700 may also comprise an interface circuit 724 in communication with the processor 712, such as via the bus 722. The interface circuit 724 may be, comprise, or be implemented by various types of standard interfaces, such as an Ethernet interface, a universal serial bus (USB) interface, a third generation input/output (3GIO) interface, a wireless interface, a BLUETOOTH interface, and/or a cellular interface, among other examples. One or more ECs (e.g., EC 740 through EC 742 as depicted) are communicatively coupled to the interface circuit 724, such as when the first processing system 700 is implemented as a network appliance, such as a switch, in the operations network. The interface circuit 724 may permit communications between the first processing system 700 and one or more ECs by one or more communication protocols, such as an Ethernet-based network protocol (such as ProfiNET, OPC, OPC/UA, Modbus TCP/IP, EtherCAT, UDP multicast, Siemens S7 communication, and/or others), a proprietary communication protocol, and/or another communication protocol. The interface circuit 724 may also comprise a communication device such as a modem or network interface card to facilitate exchange of data with external computing devices via a network, such as via Ethernet connection, digital subscriber line (DSL), telephone line, coaxial cable, cellular telephone system, and/or satellite, among other examples.

One or more input devices 726 may be connected to the interface circuit 724 and permit a user to enter data and/or commands for utilization by the processor 712. Each input device 726 may be, comprise, or be implemented by one or more instances of a keyboard, a mouse, a touchscreen, a joystick, a control switch or toggle, a button, a track-pad, a trackball, an image/code scanner, and/or a voice recognition system, among other examples.

One or more output devices 728 may also be connected to the interface circuit 724. The output device 728 may be, comprise, or be implemented by a display device, such as an LCD, an LED display, and/or a CRT display, among other examples. The interface circuit 724 may also comprise a graphics driver card to permit use of a display device as one or more of the output devices 728. One or more of the output devices 728 may also or instead be, comprise, or be implemented by one or more instances of an LED, a printer, a speaker, and/or other examples.

The one or more input devices 726 and the one or more output devices 728 connected to the interface circuit 724 may, at least in part, enable the HMI described above with respect to FIG. 3. The input device(s) 726 may permit entry of commands to the coordinated controller, and the output device(s) 728 may permit visualization or other sensory perception of various data, such as sensor data, status data, and/or other example data.

The first processing system 700 may also comprise a mass storage device 730 for storing machine-readable instructions and data. The mass storage device 730 may be connected to the processor 712, such as via the bus 722. The mass storage device 730 may be or comprise a tangible, non-transitory storage medium, such as a floppy disk drive, a hard disk drive, a compact disk (CD) drive, and/or digital versatile disk (DVD) drive, among other examples. The program code instructions 732 may be stored in the mass storage device 730, the volatile memory 718, the non-volatile memory 720, the local memory 714, a removable storage medium (such as a CD, a DVD, and/or another external storage medium 734 connected to the interface circuit 724), and/or another storage medium.

The modules and/or other components of the first processing system 700 may be implemented in accordance with hardware (such as in one or more integrated circuit chips, such as an ASIC), or may be implemented as software or firmware for execution by a processor. In the case of software or firmware, the implementation can be provided as a computer program product including a computer readable medium or storage structure containing computer program code (i.e., software or firmware) for execution by the processor.

Figure 8:
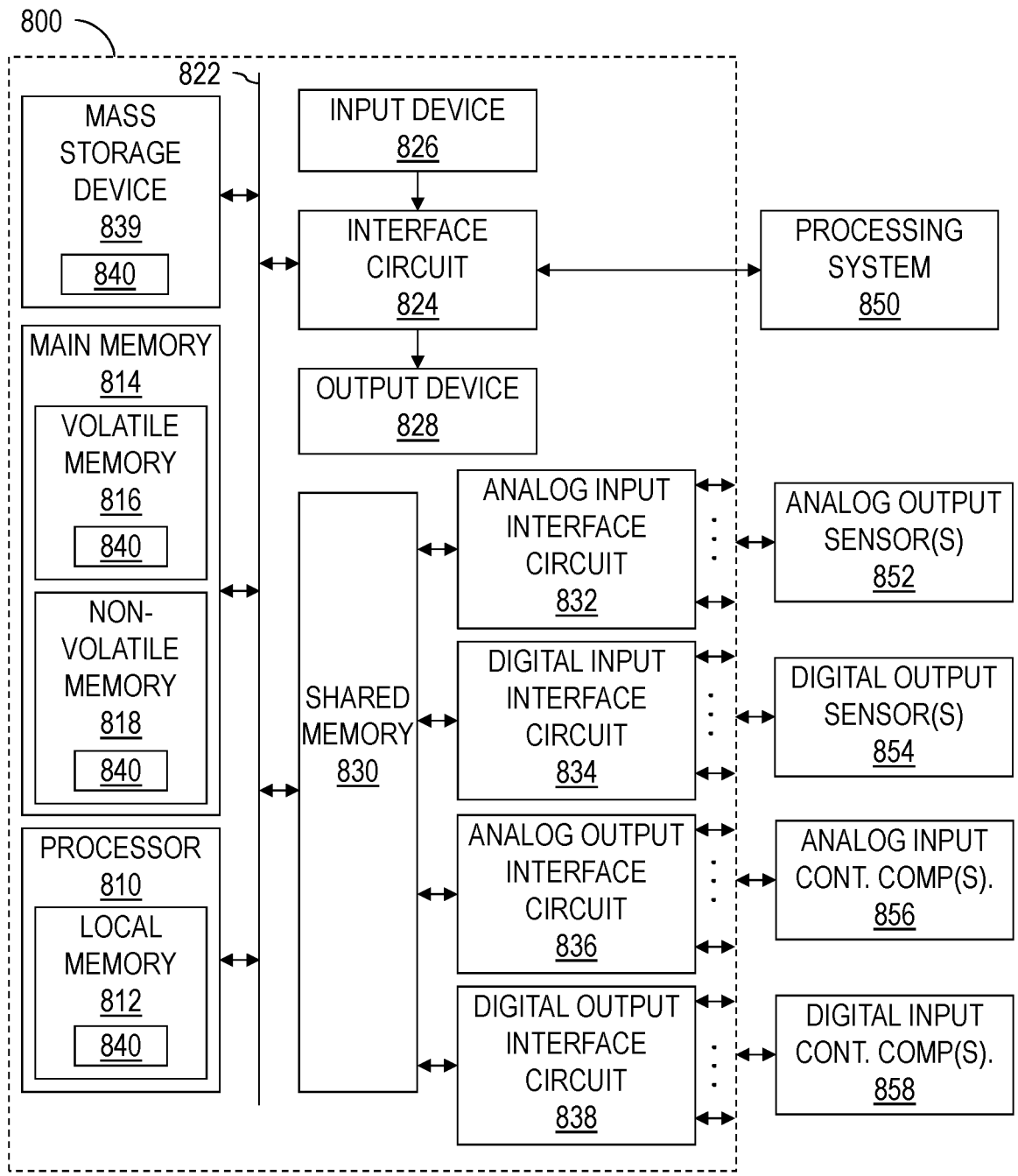
FIG. 8 is a schematic view of at least a portion of an example implementation of apparatus according to one or more aspects of the present disclosure.

FIG. 8 is a schematic view of at least a portion of an example implementation of a second processing system 800 according to one or more aspects of the present disclosure. The second processing system 800 may execute example machine-readable instructions to implement at least a portion of an EC as described herein.

The second processing system 800 may be or comprise, for example, one or more processors, controllers, special-purpose computing devices, servers, personal computers, internet appliances, and/or other types of computing devices. Moreover, while it is possible that the entirety of the second processing system 800 shown in FIG. 8 is implemented within one device, it is also contemplated that one or more components or functions of the second processing system 800 may be implemented across multiple devices, some or an entirety of which may be at the wellsite and/or remote from the wellsite of the well construction systems 100 and 250 of FIGS. 1 and 2, respectively.

The second processing system 800 comprises a processor 810 such as, for example, a general-purpose programmable processor. The processor 810 may comprise a local memory 812, and may execute program code instructions 840 present in the local memory 812 and/or in another memory device. The processor 810 may execute, among other things, machine-readable instructions or programs to implement logic for monitoring and/or controlling one or more components of a well construction system. The programs stored in the local memory 812 may include program instructions or computer program code that, when executed by an associated processor, enable monitoring and/or controlling one or more components of a well construction system. The processor 810 may be, comprise, or be implemented by one or more processors of various types operable in the local application environment, and may include one or more general-purpose processors, special-purpose processors, microprocessors, DSPs, FPGAs, ASICs, processors based on a multi-core processor architecture, and/or other processors.

The processor 810 may be in communication with a main memory 814, such as via a bus 822 and/or other communication means. The main memory 814 may comprise a volatile memory 816 and a non-volatile memory 818. The volatile memory 816 may be, comprise, or be implemented by a tangible, non-transitory storage medium, such as RAM, SRAM, SDRAM, DRAM, RDRAM, and/or other types of random access memory devices. The non-volatile memory 818 may be, comprise, or be implemented by a tangible, non-transitory storage medium, such as ROM, flash memory, and/or other types of memory devices. One or more memory controllers (not shown) may control access to the volatile memory 816 and/or the non-volatile memory 818.

The second processing system 800 may also comprise an interface circuit 824 in communication with the processor 810, such as via the bus 822. The interface circuit 824 may be, comprise, or be implemented by various types of standard interfaces, such as an Ethernet interface, a USB interface, a peripheral component interconnect (PCI) interface, and a 3GIO interface, among other examples. One or more other processing system 850 (e.g., the first processing system 700 of FIG. 7) are communicatively coupled to the interface circuit 824. The interface circuit 824 can enable communications between the second processing system 800 and one or more other processing system (e.g., a network appliance, the processing system of the configuration manager 302, or another processing system in FIG. 3) by enabling one or more communication protocols, such as an Ethernet-based network protocol (such as ProfiNET, OPC, OPC/UA, Modbus TCP/IP, EtherCAT, UDP multicast, Siemens S7 communication, and/or others), a proprietary communication protocol, and/or another communication protocol.

One or more input devices 826 may be connected to the interface circuit 824 and permit a user to enter data and/or commands for utilization by the processor 810. Each input device 826 may be, comprise, or be implemented by one or more instances of a keyboard, a mouse, a touchscreen, a joystick, a control switch or toggle, a button, a track-pad, a trackball, an image/code scanner, and/or a voice recognition system, among other examples.

One or more output devices 828 may also be connected to the interface circuit 824. The output device 828 may be, comprise, or be implemented by a display device, such as an LCD and/or an LED display, among other examples. The interface circuit 824 may also comprise a graphics driver card to enable use of a display device as one or more of the output devices 828. One or more of the output devices 828 may also or instead be, comprise, or be implemented by one or more instances of an LED, a printer, a speaker, and/or other examples.

The second processing system 800 may comprise a shared memory 830 in communication with the processor 810, such as via the bus 822. The shared memory 830 may be, comprise, or be implemented by a tangible, non-transitory storage medium, such as RAM, SRAM, SDRAM, DRAM, RDRAM, and/or other types of random access memory devices.

The second processing system 800 may comprise one or more analog input (AI) interface circuits 832, one or more digital input (DI) interface circuits 834, one or more analog output (AO) interface circuits 836, and/or one or more digital output (DO) interface circuits 838, each of which may be in communication with the shared memory 830. The AI interface circuit 832 may include one or multiple inputs, and may convert an analog signal received on an input into digital data useable by the processor 810, for example. The DI interface circuit 834 may include one or multiple inputs, and may receive a discrete signal (e.g., on/off signal), which may be useable by the processor 810. The AI interface circuit 832 and the DI interface circuit 834 are communicatively coupled to the shared memory 830, where the AI interface circuit 832 and DI interface circuit 834 can cache and/or queue input data and from which the processor 810 can access the data. The inputs of the AI interface circuit 832 and the DI interface circuit 834 are communicatively coupled to outputs of various sensors (e.g., analog output sensor 852 and digital output sensor 854), devices, components, etc., in a well construction system. The AI interface circuit 832 and the DI interface circuit 834 can be used to receive, interpret, and/or reformat sensor data and monitor the status of one or more components, such as by receiving analog signals and discrete signals, respectively, of the various sensors, devices, components, etc., in the well construction system.

The AO interface circuit 836 may include one or multiple outputs to output analog signals, which may be converted from digital data provided by the processor 810 and temporarily stored in the shared memory 830, for example. The DO interface circuit 838 may include one or multiple outputs, and can output a discrete signal (e.g., on/off signal), which may be provided by the processor 810 and temporarily stored in the shared memory 830, for example. The AO interface circuit 836 and the DO interface circuit 838 are communicatively coupled to the shared memory 830. The outputs of the AO interface circuit 836 and the DO interface circuit 838 are communicatively coupled to inputs of various devices, components, etc., such as one or more analog input controllable components 856 and/or one or more digital input controllable components 858, in a well construction system. The AO interface circuit 836 and the DO interface circuit 838 can be used to control the operation of one or more components, such as by providing analog signals and discrete signals, respectively, to the various devices, components, etc., in the well construction system.

The second processing system 800 may also comprise a mass storage device 839 for storing machine-readable instructions and data. The mass storage device 839 may be connected to the processor 810, such as via the bus 822. The mass storage device 839 may be or comprise a tangible, non-transitory storage medium, such as a floppy disk drive, a hard disk drive, a CD drive, and/or DVD drive, among other examples. The program code instructions 840 may be stored in the mass storage device 839, the volatile memory 816, the non-volatile memory 818, the local memory 812, a removable storage medium, such as a CD or DVD, and/or another storage medium.

The modules and/or other components of the second processing system 800 may be implemented in accordance with hardware (such as in one or more integrated circuit chips, such as an ASIC), or may be implemented as software or firmware for execution by a processor. In the case of software or firmware, the implementation can be provided as a computer program product including a computer readable medium or storage structure containing computer program code (i.e., software or firmware) for execution by the processor.

In view of the entirety of the present disclosure, including the figures and the claims, a person having ordinary skill in the art will readily recognize that the present disclosure introduces an apparatus comprising a first processing system comprising a processor and a memory including computer program code, wherein the first processing system is operable to: (A) receive a job plan developed by a second processing system; (B) implement the job plan comprising generating commands for one or more equipment controllers based on the job plan, wherein the one or more equipment controllers are operable to control equipment of a well construction system; (C) transmit, through a network, the commands to the one or more equipment controllers for execution of the commands by the one or more equipment controllers; and (D) iteratively: (i) monitor, through the network, current conditions of the well construction system during execution of commands by the one or more equipment controllers; (ii) update the implementation of the job plan comprising generating updated commands for the one or more equipment controllers based on the job plan and on the current conditions of the well construction system when the current conditions of the well construction system indicate a deviation from the implementation; and (iii) transmit, through the network, the updated commands to the one or more equipment controllers for execution of the updated commands by the one or more equipment controllers.

The first processing system may comprise dedicated resources comprising at least a portion of the processor and at least a portion of the memory, and the dedicated resources may be dedicated to monitoring the current conditions of the well construction system, updating the implementation, and transmitting the updated commands.

The job plan may include a generalized operation with defined constraints of parameters of the generalized operation.

The apparatus may comprise the second processing system comprising a processor and a memory including computer program code, and the second processing system may be operable to: (A) develop the job plan based on the current conditions of the well construction system; (B) transmit the job plan to the first processing system; and (C) iteratively: (i) monitor, through the network, the current conditions of the well construction system during execution of the commands by the one or more equipment controllers; (ii) update the job plan when the current conditions of the well construction system indicate a deviation from the job plan; and (iii) transmit the updated job plan to the first processing system.

The apparatus may comprise the network, the network may comprise a common data bus, the current conditions of the well construction system may be made available via the common data bus, and the first processing system may be operable to monitor the current conditions of the well construction system via the common data bus. The apparatus may further comprise a third processing system communicatively coupled to the network and comprising a processor and a memory including computer program code, wherein the third processing system is operable to translate communications between the common data bus and the one or more equipment controllers, and wherein the communications include commands and the current conditions of the well construction system. The third processing system may be operable to translate the communications between one or more of a plurality of predetermined protocols and a common protocol used on the common data bus. The predetermined protocols may include two or more selected from the group consisting of ProfiNET, OPC, OPC/UA, Modbus TCP/IP, EtherCAT, UDP multicast, and Siemens S7 communication, and the common protocol may be a DDS protocol.

The current conditions of the well construction system may include or be indicated by sensor data, status data, or a combination thereof communicated from the one or more equipment controllers.

The equipment of the well construction system may be selected from the group consisting of equipment of a drilling rig control system, equipment of a drilling fluid circulation system, equipment of a managed pressure drilling system, equipment of a cementing system, and equipment of a rig walk system.

The present disclosure also introduces an apparatus comprising: (A) a network; (B) one or more equipment controllers communicatively coupled to the network and operable to control equipment of a well construction system; (C) a first processing system communicatively coupled to the network and comprising a processor and a memory including computer program code, wherein the first processing system is operable to: (i) develop a job plan based on current conditions of the well construction system; and (ii) transmit the job plan through the network; and (D) a second processing system communicatively coupled to the network and comprising a processor and a memory including computer program code, wherein the second processing system is operable to: (i) receive the job plan through the network; (ii) implement the job plan comprising generating commands for the one or more equipment controllers based on the job plan; (iii) transmit, through the network, the commands to the one or more equipment controllers for execution of the commands by the one or more equipment controllers; and (iv) iteratively: (a) monitor, through the network, the current conditions of the well construction system during execution of commands by the one or more equipment controllers; (b) update the implementation of the job plan comprising generating updated commands for the one or more equipment controllers based on the job plan and on the current conditions of the well construction system when the current conditions of the well construction system indicate a deviation from the implementation; and (c) transmit, through the network, the updated commands to the one or more equipment controllers for execution of the updated commands by the one or more equipment controllers.

The second processing system may comprise dedicated resources comprising at least a portion of the processor and at least a portion of the memory, wherein the dedicated resources may be dedicated to monitoring the current conditions of the well construction system, updating the implementation, and transmitting the updated commands.

The job plan may include a generalized operation with defined constraints of parameters of the generalized operation.

The first processing system may be operable to iteratively: monitor, through the network, the current conditions of the well construction system during execution of the commands by the one or more equipment controllers; update the job plan when the current conditions of the well construction system indicate a deviation from the job plan; and transmit the updated job plan through the network.

The network may comprise a common data bus, the current conditions of the well construction system may be made available via the common data bus, and the second processing system may be operable to monitor the current conditions of the well construction system via the common data bus. The apparatus may further comprise a third processing system communicatively coupled to the network and comprising a processor and a memory including computer program code, the third processing system may be operable to translate communications between the common data bus and the one or more equipment controllers, and the communications may include commands and the current conditions of the well construction system. The third processing system may be operable to translate the communications between one or more of a plurality of predetermined protocols and a common protocol used on the common data bus. The predetermined protocols may include two or more selected from the group consisting of ProfiNET, OPC, OPC/UA, Modbus TCP/IP, EtherCAT, UDP multicast, and Siemens S7 communication, and the common protocol may be a DDS protocol.

The current conditions of the well construction system may include or be indicated by sensor data, status data, or a combination thereof communicated from the one or more equipment controllers.

The equipment of the well construction system may be selected from the group consisting of equipment of a drilling rig control system, equipment of a drilling fluid circulation system, equipment of a managed pressure drilling system, equipment of a cementing system, and equipment of a rig walk system.

The present disclosure also introduces a method comprising operating a first processing system comprising a processor and a memory including computer program code, wherein operating the first processing system comprises: (A) receiving a job plan developed by a second processing system; (B) implementing the job plan comprising generating commands for one or more equipment controllers based on the job plan, wherein the one or more equipment controllers are operable to control equipment of a well construction system; (C) transmitting, through a network, the commands to the one or more equipment controllers for execution of the commands by the one or more equipment controllers; and (D) iteratively: (i) monitoring, through the network, current conditions of the well construction system during execution of commands by the one or more equipment controllers; (ii) updating the implementation of the job plan comprising generating updated commands for the one or more equipment controllers based on the job plan and on the current conditions of the well construction system when the current conditions of the well construction system indicate a deviation from the implementation; and (iii) transmitting, through the network, the updated commands to the one or more equipment controllers for execution of the updated commands by the one or more equipment controllers.

The first processing system may comprise dedicated resources comprising at least a portion of the processor and at least a portion of the memory, wherein the dedicated resources may be dedicated to monitoring the current conditions of the well construction system, updating the implementation, and transmitting the updated commands.

The job plan may include a generalized operation with defined constraints of parameters of the generalized operation.

The method may comprise operating the second processing system, which comprises a processor and a memory including computer program code, wherein operating the second processing system may comprise: (A) developing the job plan based on the current conditions of the well construction system; (B) transmitting the job plan to the first processing system; and (C) iteratively: (i) monitoring, through the network, the current conditions of the well construction system during execution of the commands by the one or more equipment controllers; (ii) updating the job plan when the current conditions of the well construction system indicate a deviation from the job plan; and (iii) transmitting the updated job plan to the first processing system.

The network may comprise a common data bus, the current conditions of the well construction system may be made available via the common data bus, and monitoring the current conditions of the well construction system by the first processing system may be via the common data bus. The method may further comprise operating a third processing system communicatively coupled to the network and comprising a processor and a memory including computer program code, wherein operating the third processing system may comprise translating communications between the common data bus and the one or more equipment controllers, and wherein the communications may include commands and the current conditions of the well construction system. The third processing system may be operable to translate the communications between one or more of a plurality of predetermined protocols and a common protocol used on the common data bus. The predetermined protocols may include two or more selected from the group consisting of ProfiNET, OPC, OPC/UA, Modbus TCP/IP, EtherCAT, UDP multicast, and Siemens S7 communication, and the common protocol may be a DDS protocol.

The current conditions of the well construction system may include or be indicated by sensor data, status data, or a combination thereof communicated from the one or more equipment controllers.

The equipment of the well construction system may be selected from the group consisting of equipment of a drilling rig control system, equipment of a drilling fluid circulation system, equipment of a managed pressure drilling system, equipment of a cementing system, and equipment of a rig walk system.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A system comprising:
    a processor;
    memory accessible by the processor;
    processor-executable instructions stored in the memory and executable to instruct the system to:
    develop a job plan based on geological data and geophysical data measured of a target formation of a well being constructed by a well construction system;
    generate a generalized command based on the job plan from at least one process application to a coordinated controller that includes an intended general operation and defined constraints for a drilling operation for the well being constructed;
    implement control logic by the coordinated controller to translate the generalized command and to issue specific commands to at least one equipment controller that is operable to control various controllable components of the well construction system based on the defined constraints for the drilling operation; and
    receive sensor data during execution of the job plan by the at least one equipment controller to determine if at least one indication is present that indicates that construction of the well is deviating from the defined constraints for the drilling operation, wherein upon determining that the at least one indication is present, the coordinated controller updates the specific commands issued to the at least one equipment controller to control the various controllable components based on an alteration of the job plan.

2. The system of claim 1, wherein the coordinated controller is configured to alter and update the job plan upon determining that the at least one indication is present that indicates that the construction of the well is deviating from the defined constraints for the drilling operation.

3. The system of claim 1, wherein the coordinated controller is configured to issue the specific commands to the at least one equipment based on the defined constraints for the drilling operation without updating the job plan to permit operations to continue based on the job plan upon determining that the at least one indication is not present.

4. The system of claim 1, wherein the coordinated controller is configured to monitor a status of various equipment controlled by the at least one equipment controller to optimize operations of equipment of subsystems based on the sensor data.

5. The system of claim 1, wherein the coordinated controller is configured to continuously update the specific commands issued to the at least one equipment controller based on the sensor data to account for a changing environment.

6. The system of claim 1, wherein the defined constraints for the drilling operation include at least one of: a desired function of rate of penetration of drilling related to a top drive revolutions per minute and a weight on bit.

7. The system of claim 6, wherein the coordinated controller is configured to continuously update the specific commands issued to the at least one equipment controller based on determining that the desired function of the rate of penetration is greater or less than anticipated by the job plan.

8. The system of claim 6, wherein the coordinated controller is configured to calculate and issue commands to increase or decrease at least one of: the top drive revolutions per minute and the weight on bit based on determining that the desired function of the rate of penetration is greater or less than anticipated by the job plan.

9. The system of claim 1, wherein the job plan includes details pertaining to trajectory of the well and mud, casing, drill bits, and bottom hole assembly components to be used during the construction of the well.

10. A method comprising:
developing a job plan based on geological data and geophysical data measured of a target formation of a well being constructed by a well construction system;
generating a generalized command based on the job plan from at least one process application that includes an intended general operation and defined constraints for a drilling operation for the well being constructed;
translating the generalized command to specific commands to be issued to control various controllable components based on the defined constraints for the drilling operation; and
receiving sensor data during execution of the job plan to determine if at least one indication is present that indicates that construction of the well is deviating from the defined constraints for the drilling operation, wherein upon determining the at least one indication is present, updating the specific commands to be issued to control the various controllable components based on an alteration of the job plan.

11. The method of claim 10, further including altering and updating the job plan upon determining that the at least one indication is present that indicates that the construction of the well is deviating from the defined constraints for the drilling operation.

12. The method of claim 10, further including issuing the specific commands based on the defined constraints for the drilling operation without updating the job plan to permit operations to continue based on the job plan upon determining that the at least one indication is not present.

13. The method of claim 10, further including monitoring a status of various equipment to optimize operations of equipment of subsystems based on the sensor data.

14. The method of claim 10, further including continuously updating the specific commands to be issued based on the sensor data to account for a changing environment.

15. The method of claim 10, wherein the defined constraints for the drilling operation include at least one of: a desired function of rate of penetration of drilling related to a top drive revolutions per minute and a weight on bit.

16. The method of claim 15, further including continuously updating the specific commands to be issued based on determining that the desired function of the rate of penetration is greater or less than anticipated by the job plan.

17. The method of claim 15, further including calculating and issuing commands to increase or decrease at least one of: the top drive revolutions per minute and the weight on bit based on determining that the desired function of the rate of penetration is greater or less than anticipated by the job plan.

18. The method of claim 10, wherein the job plan includes details pertaining to trajectory of the well and mud, casing, drill bits, and bottom hole assembly components to be used during the construction of the well.

19. A non-transitory computer-readable storage medium storing instructions that when executed by a computer, which includes a processor performs a method, the method comprising:
developing a job plan based on geological data and geophysical data measured of a target formation of a well being constructed by a well construction system;
generating a generalized command based on the job plan from at least one process application that includes an intended general operation and defined constraints for a drilling operation for the well being constructed;
translating the generalized command to specific commands to be issued to control various controllable components based on the defined constraints for the drilling operation; and
receiving sensor data during execution of the job plan to determine if at least one indication is present that indicates that construction of the well is deviating from the defined constraints for the drilling operation, wherein upon determining the at least one indication is present, updating the specific commands to be issued to control the various controllable components based on an alteration of the job plan.

20. The non-transitory computer-readable storage medium of claim 19, wherein the defined constraints for the drilling operation include at least one of: a desired function of rate of penetration of drilling related to a top drive revolutions per minute and a weight on bit.

* * * * *